United States Patent
Minemura et al.

(10) Patent No.: US 9,390,624 B2
(45) Date of Patent: Jul. 12, 2016

(54) VEHICLE-INSTALLATION INTERSECTION JUDGMENT APPARATUS AND PROGRAM

(71) Applicants: DENSO CORPORATION, Kariya, Aichi-pref. (JP); Nippon Soken, Inc., Nishio, Aichi-pref. (JP)

(72) Inventors: Akitoshi Minemura, Nishio (JP); Yoshihisa Ogata, Chiryu (JP); Takahisa Yokoyama, Anjo (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 21 days.

(21) Appl. No.: 14/227,371

(22) Filed: Mar. 27, 2014

(65) Prior Publication Data

US 2014/0297171 A1 Oct. 2, 2014

(30) Foreign Application Priority Data

Mar. 29, 2013 (JP) ................. 2013-072799

(51) Int. Cl.
| G08G 1/16 | (2006.01) |
| B60R 21/34 | (2011.01) |
| G01S 13/93 | (2006.01) |
| G01S 13/86 | (2006.01) |

(52) U.S. Cl.
CPC ............. *G08G 1/166* (2013.01); *B60R 21/34* (2013.01); *G01S 13/867* (2013.01); *G01S 13/931* (2013.01)

(58) Field of Classification Search
CPC ..... B60R 21/34; G01S 13/867; G01S 13/931; G08G 1/166

USPC ............ 701/300, 301, 302; 342/70; 340/435, 340/436; 348/148
See application file for complete search history.

(56) References Cited

U.S. PATENT DOCUMENTS

| 6,025,797 | A | * | 2/2000 | Kawai | ............... B60K 31/0008 342/175 |
| 6,035,053 | A | * | 3/2000 | Yoshioka | ........... B60K 31/0008 340/435 |
| 6,275,722 | B1 | * | 8/2001 | Martin et al. | ................. 600/410 |

(Continued)

FOREIGN PATENT DOCUMENTS

| JP | H10-100820 | 4/1998 |
| JP | 2008-197720 | 8/2008 |

(Continued)

OTHER PUBLICATIONS

Office Action dated Aug. 4, 2015 in corresponding Japanese Application No. 2013-072799 with English translation.

*Primary Examiner* — Fadey Jabr
*Assistant Examiner* — Angelina Shudy
(74) *Attorney, Agent, or Firm* — Harness, Dickey & Pierce, P.L.C.

(57) ABSTRACT

A vehicle-installation intersection judgment apparatus determines whether a target object such as a pedestrian is located ahead and to one side of the vehicle, and if so, judges whether the object is moving laterally to intersect with the advancement of the vehicle. Successive amounts of lateral displacement of the object are periodically derived, each amount is compared with a displacement threshold, a count is made of the number of times that the displacement threshold is exceeded, and the count is compared with a predetermined count threshold. The judgment concerning the target object is made based upon whether the count threshold is attained.

22 Claims, 12 Drawing Sheets

(56) References Cited

U.S. PATENT DOCUMENTS

| | | | | |
|---|---|---|---|---|
| 6,311,123 B1* | 10/2001 | Nakamura | B60K 31/0008 | 123/352 |
| 6,516,278 B1* | 2/2003 | Ishizaki et al. | | 702/33 |
| 7,113,867 B1* | 9/2006 | Stein | G06K 9/00805 | 701/301 |
| 8,762,043 B2* | 6/2014 | Eidehall | B62D 15/0265 | 701/301 |
| 8,825,371 B2* | 9/2014 | Prokhorov | G01C 21/3602 | 340/435 |
| 8,954,250 B2* | 2/2015 | Kimura | G08G 1/166 | 701/301 |
| 9,056,615 B2* | 6/2015 | Harda | B60W 30/08 | |
| 9,187,091 B2* | 11/2015 | Mills | B60W 40/107 | |
| 2002/0189875 A1* | 12/2002 | Asanuma | G01S 7/4026 | 180/169 |
| 2003/0218564 A1* | 11/2003 | Tamatsu | G01S 7/414 | 342/70 |
| 2005/0090950 A1* | 4/2005 | Sawamoto | G08G 1/166 | 701/23 |
| 2006/0142921 A1* | 6/2006 | Takeda | B60T 8/17557 | 701/70 |
| 2009/0299576 A1* | 12/2009 | Baumann | B60R 21/0134 | 701/45 |
| 2010/0063685 A1* | 3/2010 | Bullinger | B60R 21/013 | 701/45 |
| 2010/0222960 A1* | 9/2010 | Oida et al. | | 701/29 |
| 2011/0043344 A1* | 2/2011 | Nichols | B60R 21/0136 | 340/436 |
| 2011/0050481 A1* | 3/2011 | Itoh et al. | | 342/27 |
| 2011/0231067 A1* | 9/2011 | Itoga | B60R 21/0134 | 701/46 |
| 2012/0235852 A1* | 9/2012 | Hattori et al. | | 342/70 |
| 2013/0024075 A1* | 1/2013 | Zagorski et al. | | 701/46 |
| 2013/0223686 A1* | 8/2013 | Shimizu et al. | | 382/103 |
| 2014/0257686 A1* | 9/2014 | Feldman et al. | | 701/300 |

FOREIGN PATENT DOCUMENTS

| | | |
|---|---|---|
| JP | 2011-164989 | 8/2011 |
| JP | 2012-194863 | 10/2012 |

\* cited by examiner

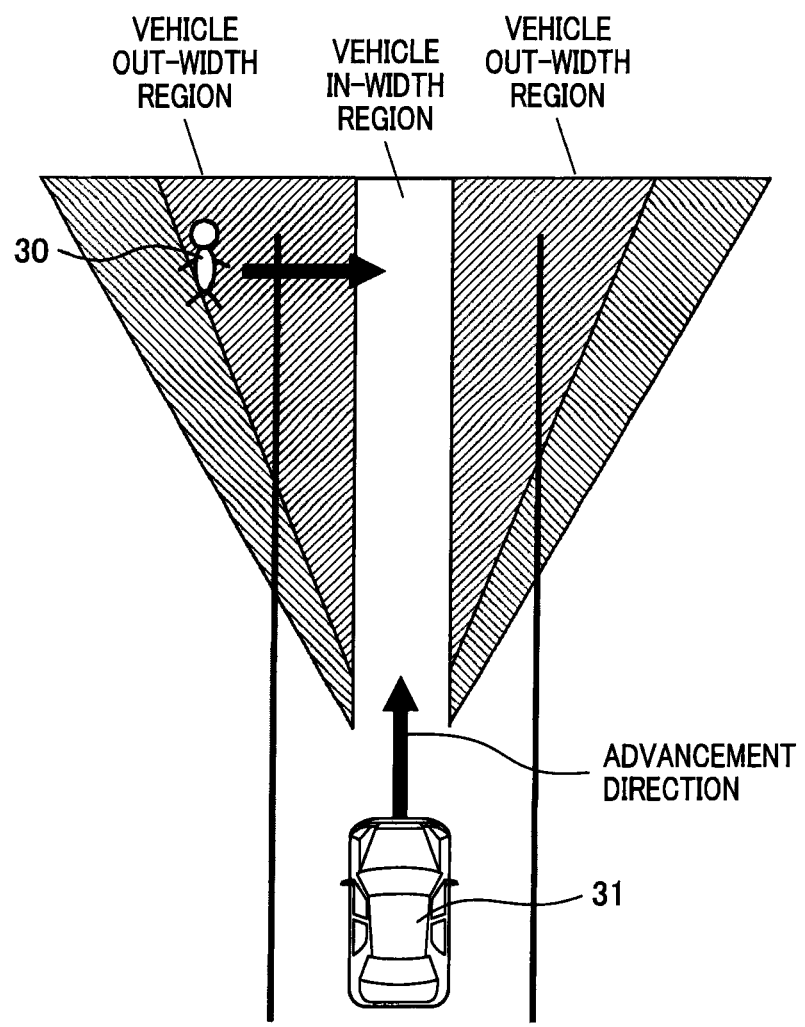

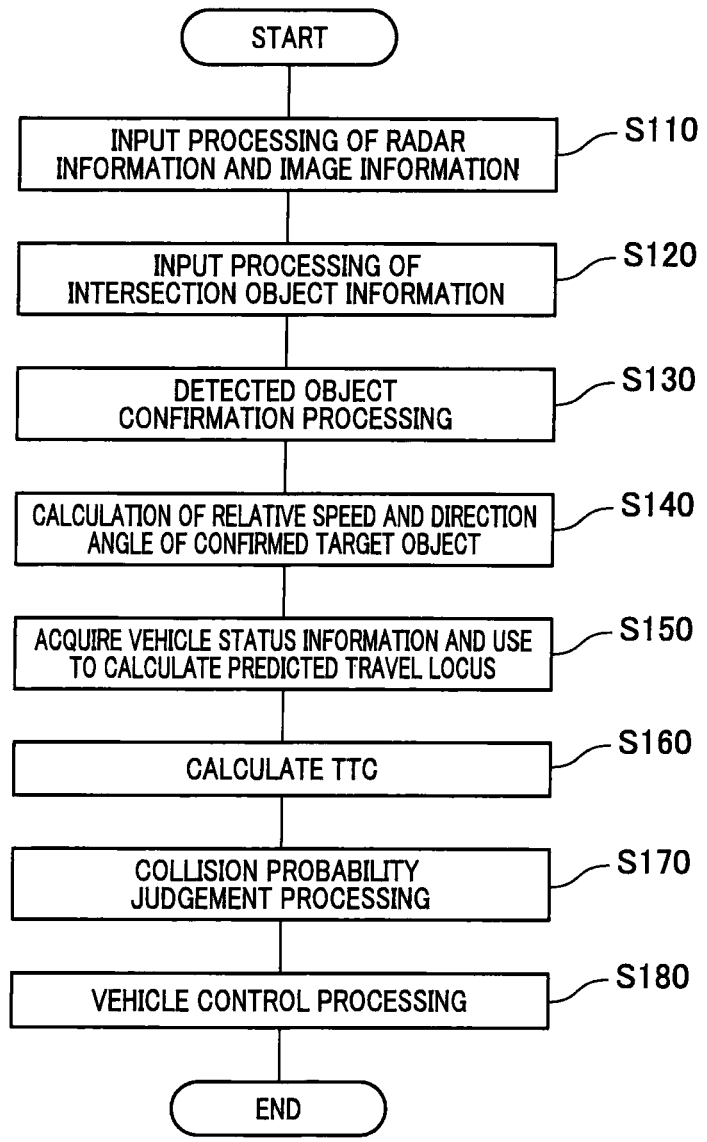

(PROCESSING EXECUTED BY INTERSECTION JUDGEMENT APPARATUS)

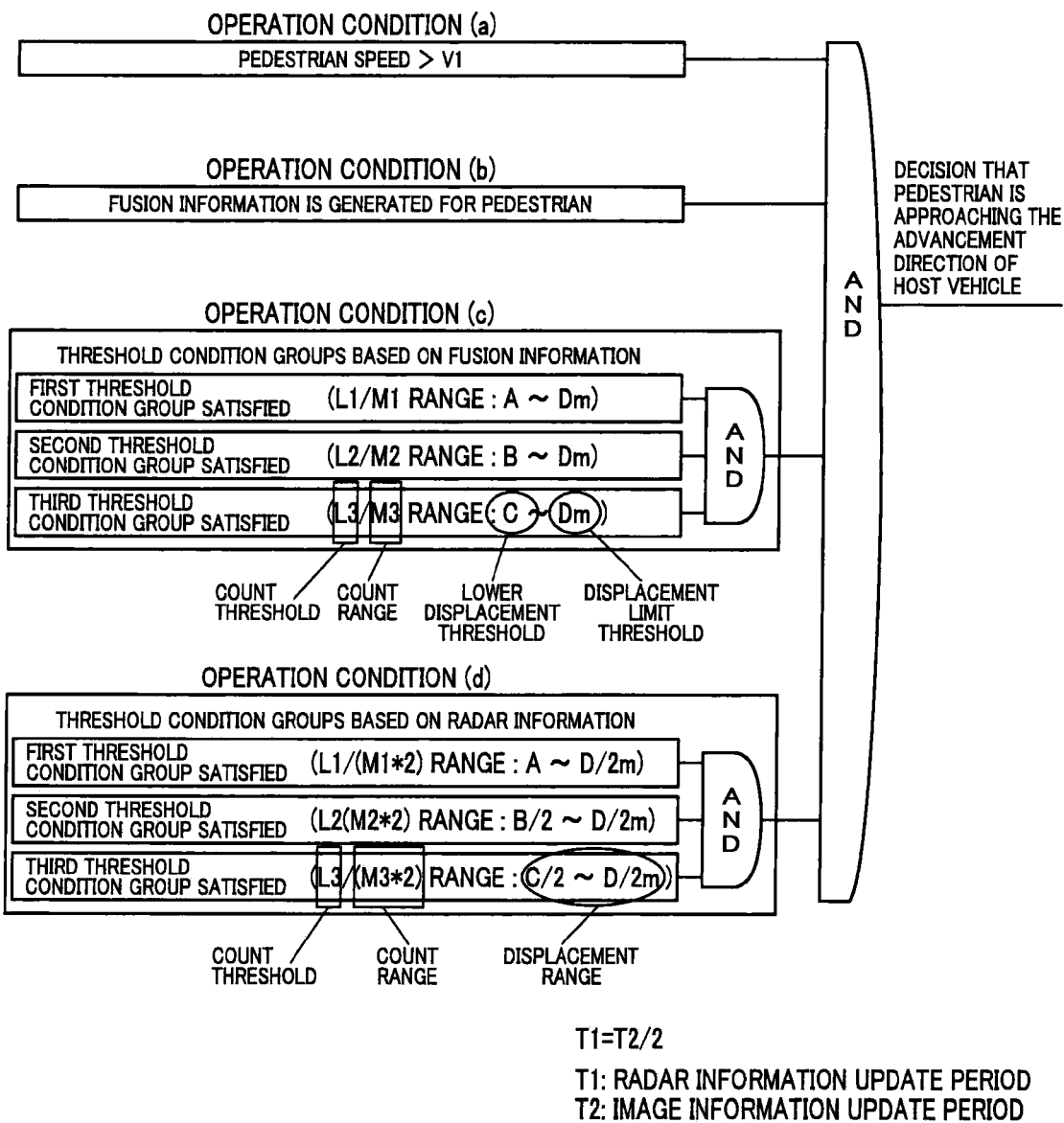

Em  Em 0.83m/T2 sec
(SPEED X km/h)

Y m + Z m

LATERAL DISPLACEMENT
AMOUNT EXCEEDING Dm

31

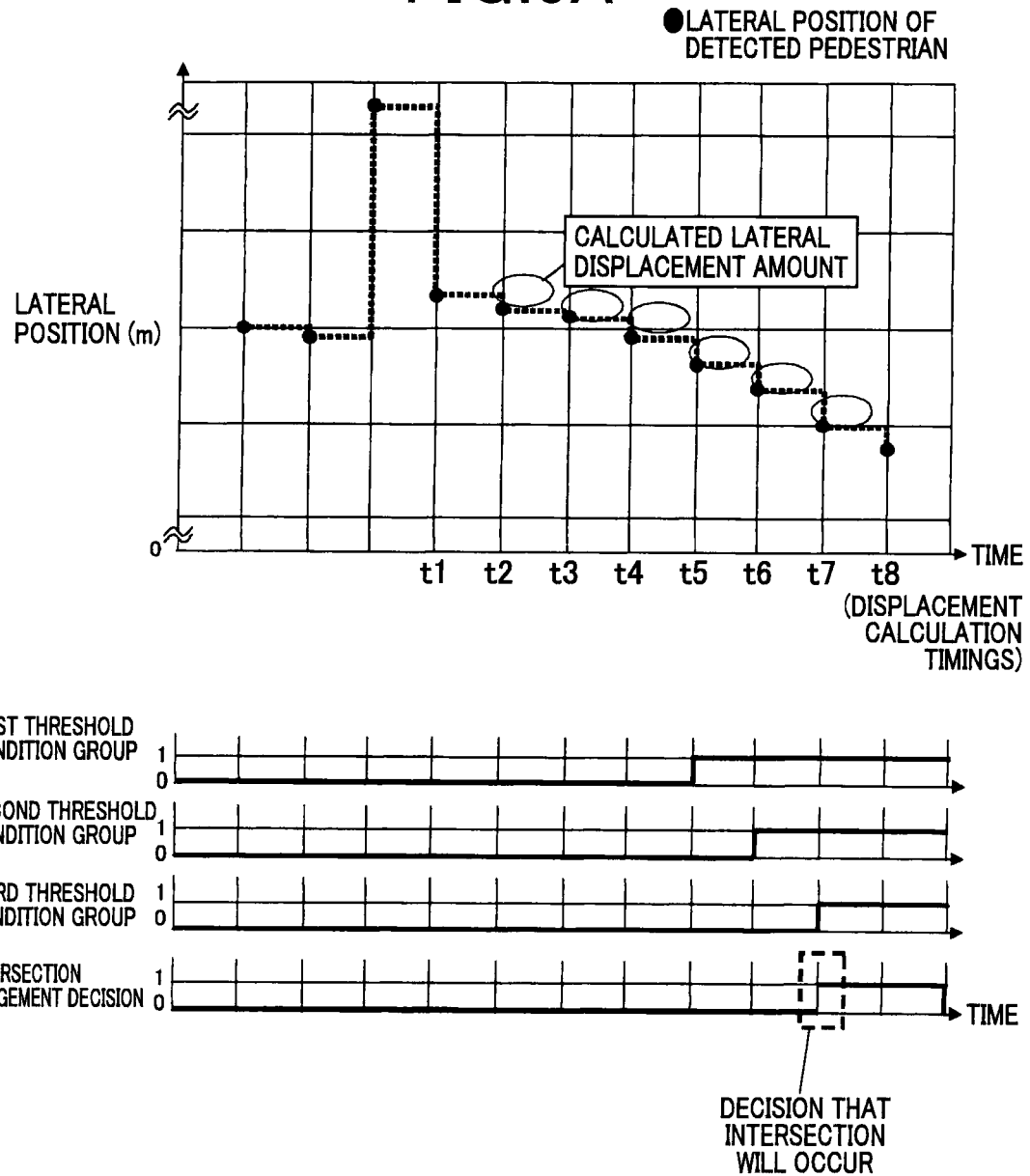

TIMING t5 : FIRST THRESHOLD CONDITION GROUP BECOMES SATISFIED (WITHIN COUNT RANGE M1)
TIMING t6 : SECOND THRESHOLD CONDITION GROUP BECOMES SATISFIED (WITHIN COUNT RANGE M2)
TIMING t7 : THIRD THRESHOLD CONDITION GROUP BECOMES SATISFIED (WITHIN COUNT RANGE M3)

VEHICLE-INSTALLATION INTERSECTION JUDGMENT APPARATUS AND PROGRAM

CROSS-REFERENCE TO RELATED APPLICATIONS

This application is based on and incorporates herein by reference Japanese Patent Publication No. 2013-72799 filed on Mar. 29, 2013.

BACKGROUND OF THE INVENTION

1. Field of Application

The present invention relates to an intersection judgement apparatus and program, for judging when an object located ahead and to one side of a vehicle is moving laterally to intersect with the motion path of the vehicle.

2. Description of Related Art

Types of pre-crash safety system (abbreviated in the following to PCS) are known for installation on a vehicle (referred to in the following as the host vehicle). Such a system can detect a target object such as another vehicle, obstacle, pedestrian, etc., based on information obtained from a radar apparatus and/or an imaging (camera-based) system. The system can for example calculate the TTC (time to collision), i.e., the time remaining until the host vehicle will collide with the target object, by dividing the distance between the host vehicle and the target object by their relative speed. If it is judged based on the TTC that there is a high risk of collision, the PCS can take actions such as generating warnings to the driver of the host vehicle, executing automatic braking of the vehicle, etc., for attempting to prevent the collision.

It is necessary for a PCS to take such actions when a target object is located directly ahead of the host vehicle. However such actions are also necessary when an object such as a pedestrian is positioned ahead of the host vehicle, outside the travel path of the host vehicle, but is becoming successively displaced along a lateral intersection direction (a direction oriented towards and at right angles to the advancement direction of the host vehicle).

The PCS may be configured to detect such a circumstance. However when the host vehicle is being driven for example along a city street where there are many pedestrians, the following problem may arise with the prior art. If the PCS attempts to obtain TTC values for all of the nearby pedestrians who are located ahead of the host vehicle, at the left and right sides of the vehicle travel path, then even when a detected pedestrian moves only momentarily along a lateral intersection direction for a short distance, the PCS may take actions such as generating warning indications, executing automatic braking, etc., which are unnecessary. Hence in such a case, the pedestrians may become obstructions to the progress of the vehicle.

There is thus a requirement for a type of PCS having increased reliability of judging whether a target object such as a pedestrian is actually becoming significantly displaced along a lateral intersection direction, for ensuring that the PCS does not take actions such as generating warning indications, etc., when these actions are unnecessary. Such an improvement of a PCS is referred to in the following as an "improvement of the off performance".

As a measure for improving the off performance of a PCS, it has been proposed for example in Japanese patent publication No. 2008-197720 as described referring to a second embodiment, that amounts of lateral displacement of a pedestrian towards the advancement direction of the host vehicle are successively detected. If a detected amount of lateral displacement exceeds a threshold value TH1, a warning indication is generated. Each amount of lateral displacement is calculated as an absolute value of a displacement vector, oriented towards and at right angles to the advancement direction of the host vehicle.

Although a radar apparatus or camera apparatus of such a prior art PCS may momentarily detect a target object such as a pedestrian moving in a lateral intersection direction, in many cases it is not possible to continuously detect the motion of the target object. This can occur for example when the object enters a blind spot (i.e., a position at which the field of view of the radar apparatus and/or camera apparatus of the host vehicle becomes partially or completely obstructed by some obstacle, etc.). In such a case, the PCS may not take necessary actions such as generating warning indications, etc., when required.

However if it is attempted to reduce that danger, by relaxing the conditions which must be satisfied before the PCS takes actions such as generating warning indications (e.g., by lowering the threshold value used to judge the magnitudes of obtained values of lateral displacement) there is an increased possibility that the PCS will take such actions unnecessarily, so that the off performance of the PCS will deteriorate.

SUMMARY OF THE INVENTION

Hence it is desired to overcome the above problem, by providing an intersection judgement apparatus and program for installation on a host vehicle, which provide increased reliability and accuracy of judgement as to whether a target object such as a pedestrian positioned ahead of the host vehicle, at one side of the motion path of the host vehicle, is moving laterally to intersect with the advancement of the host vehicle.

An intersection judgement apparatus according to the present invention basically comprises distance measurement circuitry, direction angle measurement circuitry, displacement amount calculation circuitry, and intersection judgement circuitry. A target object detection apparatus periodically derives target object information (i.e., repetitively obtains updated target object information, with a fixed period between successive updatings) relating to target objects located within regions at either side of the host vehicle, ahead of the vehicle. The distance measurement circuitry periodically calculates the distance between the host vehicle and each target object based on the target object information, and the direction angle measurement circuitry periodically calculates the direction angle of the target object relative to the host vehicle based on the target object information. The displacement amount calculation circuitry periodically calculates an amount of lateral displacement of the target object (i.e., displacement along a direction towards and at right angles to the advancement direction of the host vehicle) based upon the calculated values of distance and direction angle of the target object. The intersection judgement circuitry utilizes the calculated lateral displacement amounts to judge whether the target object is moving along the displacement direction.

The invention is characterized in that the intersection judgement circuitry employs one or more threshold condition groups, in judging the lateral displacement amounts. Each threshold condition group is associated with a corresponding lower displacement threshold and a corresponding count threshold. With respect to a specific target object and a specific threshold condition group, the intersection judgement circuitry counts the number of times that successively calculated lateral displacement amounts obtained for the target object exceed the lower displacement threshold corresponding to the threshold condition group, and judges that the threshold condition group is satisfied when the counted number of times attains the corresponding count threshold.

Preferably, it is judged that the threshold condition group is satisfied only when the counted number of times attains the corresponding count threshold within a predetermined count range (i.e., predetermined number of consecutive lateral displacement calculation operations) having a value greater than the count threshold.

A plurality of threshold condition groups are preferably utilized, having respectively different values of the lower displacement threshold and of the corresponding count threshold. In that case, the intersection judgement circuitry judges the probability that the target object is moving along the intersection direction based upon the respective statuses (i.e., satisfied or not satisfied) of the plurality of threshold condition groups.

Preferably, the intersection judgement circuitry judges that the target object is moving along the intersection direction only if all of the plurality of threshold condition groups become satisfied. However alternatively, the intersection judgement circuitry may be configured to make that judgement if at least one of the plurality of threshold condition groups becomes satisfied.

In assigning the respective values of count threshold and lower displacement threshold for such a plurality of threshold condition groups, the lower is made the value of the count threshold corresponding to a threshold condition group, the higher is made the value of the corresponding lower displacement threshold.

Furthermore preferably a value of a displacement limit threshold is predetermined as being higher than each of the values of lower displacement threshold, i.e., each of the threshold condition groups is assigned a corresponding displacement amount range, extending between the corresponding lower displacement threshold and the (fixed) displacement limit threshold.

The displacement limit threshold is set in accordance with the type of target object that is to be judged, e.g., based on an assumed maximum value of motion speed of that type of object, such as the highest walking speed that would be expected for a pedestrian. When a calculated displacement amount exceeds the displacement limit threshold, that occurrence is not counted.

The target object detection apparatus may be implemented as a radar apparatus, with the distance and direction angle of a target object being obtained from radar information supplied from the radar apparatus.

Alternatively, the target object detection apparatus may be implemented as an imaging apparatus, i.e., a combination of a camera which captures successive images of an external scene as respective frames of data, and circuitry for processing the images to derive image information, with the distance and direction angle of a target object being obtained from the image information.

However preferably a radar apparatus and an imaging apparatus are used in combination, with each position of a target object being obtained as a fusion (combination) position, i.e., expressed by a distance value and a direction value respectively derived from radar information and from image information.

In that case, the radar apparatus and the imaging apparatus are configured for enabling a position of a target object to be obtained based on the radar information alone and also based on the image information alone. A fusion position is selected as valid (for use in calculating an updated lateral displacement amount) only if there is at least some overlap between a first position error region and a second position error region. The first position error region is derived by adding estimated image measurement error amounts to a position for the target object that is obtained based only on the image information, while the second position error region is derived by adding estimated radar measurement error amounts to a position for the target object that is obtained based only on the radar information.

BRIEF DESCRIPTION OF THE DRAWINGS

FIG. 2B is a corresponding diagram illustrating a vehicle in-width region and vehicle out-width regions of the detection ranges;

FIG. 3 is a flow diagram of a processing routine executed by an operation judgement apparatus of the PCS;

FIG. 6 is a logic block diagram for describing intersection judgement processing executed by the embodiment;

FIG. 9A graphically illustrates a specific example of evaluating satisfied/non-satisfied statuses of a plurality of threshold condition groups, in the intersection judgement processing.

DESCRIPTION OF PREFERRED EMBODIMENTS

Figure 1A:
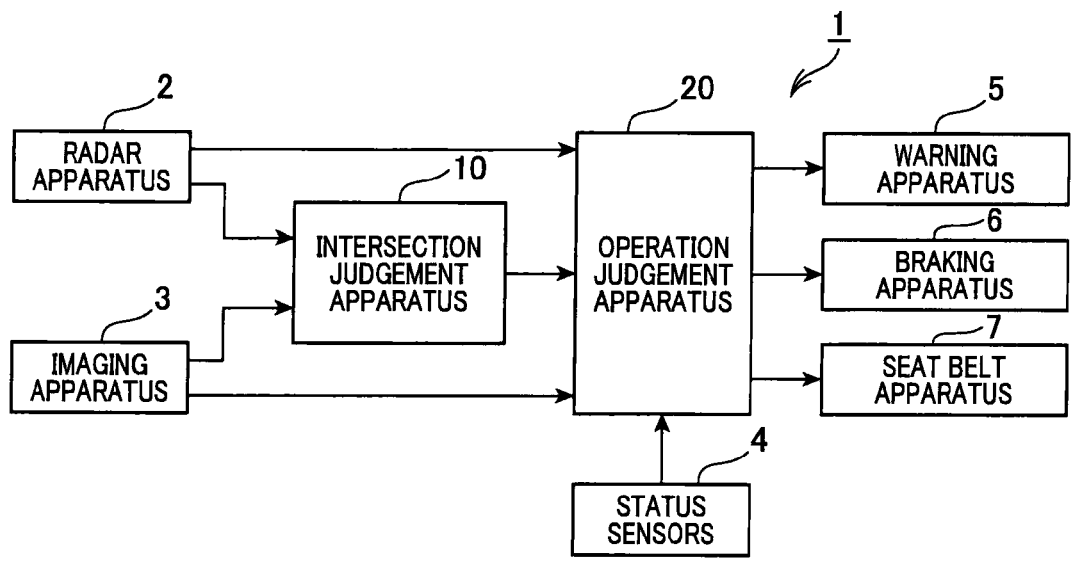
FIG. 1A is a block diagram of a PCS (pre-crash system) incorporating an embodiment of an intersection judgement apparatus.

A PCS (Pre-Crash System) incorporating an embodiment of an intersection judgement apparatus will be described referring to the drawings. The PCS is installed on a host vehicle, and controls the host vehicle when it is judged that a collision with an obstacle appears to be imminent, with the control being executed such as to avert the collision or reduce the severity of the collision if it occurs.

As shown in FIG. 1A, the PCS 1 includes a radar apparatus 2, an imaging apparatus 3, status sensors 4, a warning apparatus 5, a braking apparatus 6, a seat belt apparatus 7 an intersection judgement apparatus 10 and an operation judgement apparatus 20.

Each of the intersection judgement apparatus 10 and the operation judgement apparatus 20 can be based on one or more microcomputers, however with this embodiment a single microcomputer is utilized as illustrated in FIG. 2B. Specifically, the functions of the intersection judgement apparatus 10 are implemented by the CPU 100 of the microcomputer in executing a program stored in a ROM 101 or flash memory 103 of the microcomputer, in conjunction with operations executed by a DSP (digital signal processor) 11. The functions of the operation judgement apparatus 20 are implemented by the CPU 100 in executing a stored program, in conjunction with operations executed by a DSP 21. The microcomputer also includes a RAM 102, used as a working memory area for the CPU 100.

The radar apparatus 2 is installed at the front end of the host vehicle, and transmits radar waves within a specific detection range extending ahead of the host vehicle. Radar information is obtained from resultant received reflected waves, and updated radar information is outputted to the intersection judgement apparatus 10 and the operation judgement apparatus 20 periodically with a fixed repetition period, designated as T1 sec.

The radar apparatus 2 is a FMCW (Frequency Modulation Continuous Wave) radar apparatus which transmits frequency-modulated radar waves. The transmitted radar waves alternately increase and decrease in frequency in successive periods, with resultant reflected waves being received from a target object located ahead of the host vehicle within the detection range (scan range) of the radar apparatus 2. The transmitted and received waves are mixed to obtain a beat signal, having a frequency (beat frequency) in accordance with the relative speed and distance between the host vehicle and the target object.

The receiving antenna and/or the transmitting antenna of the radar apparatus is an array antenna. Beat signals are obtained from each of respective channels, where "channel" signifies a specific combination of array elements of an array antenna. ND conversion is applied to each of these beat signals, and the resultant data (digitized beat signals) are supplied as the radar information to the intersection judgement apparatus 10 and to the operation judgement apparatus 20.

The imaging apparatus 3 is located at the front end of the host vehicle and captures images of an external region ahead of the vehicle, within a specific detection range. For the purposes of describing the embodiment, the "detection range" of the radar apparatus or the imaging apparatus is to be understood as referring to an azimuth angular range. The imaging apparatus 3 derives image information based on the captured images, and periodically generates updated image information, with a fixed repetition period designated is as T2 sec, which is twice the period (T1 sec) of repetitively updating the radar information. The image information is supplied to the intersection judgement apparatus 10 and to the operation judgement apparatus 20.

Figure 2A:
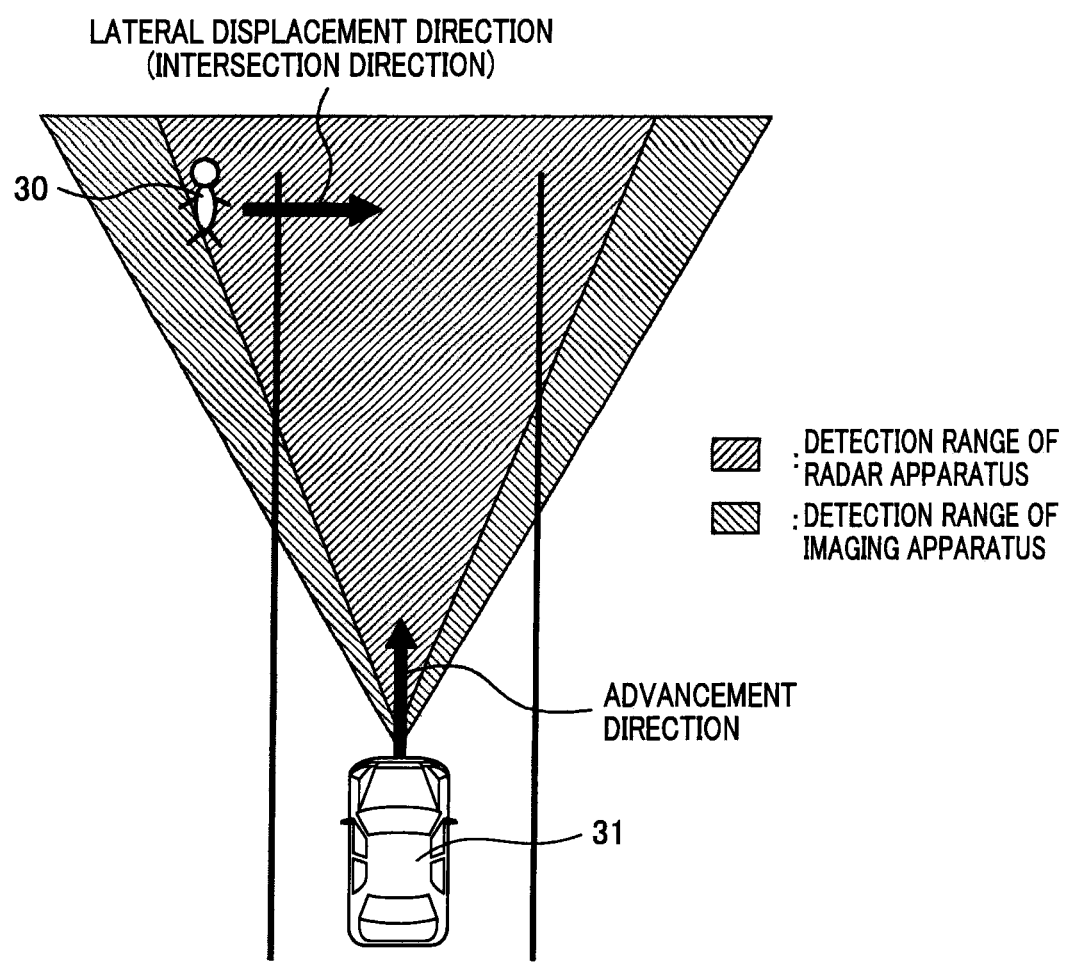
FIG. 2A is a diagram for describing detection ranges of a radar apparatus and an imaging apparatus of the PCS.

The imaging apparatus 3 is a combination of an image sensor type of camera such as a CCD sensor camera, and image processing circuitry for processing each of successive images captured by the camera as respective image data frames. The imaging apparatus 3 captures a wider detection range than the detection range of the radar apparatus 2, with the detection ranges overlapping as illustrated in the conceptual plan view of FIG. 2A. In FIG. 2A, numeral 31 denotes the host vehicle, with a pedestrian 30 moving laterally in an intersection direction with respect to the advancement direction of the host vehicle 31. The designation "advancement direction" here signifies a direction oriented along a central axis of elongation of the vehicle, as illustrated in FIG. 2A. The imaging apparatus 3 applies a known type of image processing such as template matching to respective captured images, to detect objects appearing in the captured images, i.e., which are currently within the detection range of the imaging apparatus 3.

The image information which is periodically outputted (updated) by the imaging apparatus 3 consists of a captured image together with attached information concerning any target objects which have been detected in the image by applying the image processing. The attached information specifies at least the size and position of each detected target object within the corresponding captured image.

The status sensors 4 detect the running conditions of the host vehicle and include a vehicle speed sensor which detects the running speed of the host vehicle, an acceleration sensor which detects the vehicle acceleration, a steering angle sensor which detects the steering angle of the vehicle, a yaw rate sensor which detects the yaw rate of the host vehicle with respect to the advancement direction, etc. Status information which expresses the detection results from these sensors is outputted to the operation judgement apparatus 20.

The warning apparatus 5 consists of a loudspeaker and visual display apparatus which are installed within the interior of the host vehicle. These are used by the PCS 1 to generate audible warning sounds and messages, and warning images, when it is judged by the operation judgement apparatus 20 that the risk of collision with an obstacle has become high, for notifying the vehicle driver of the danger and thereby enabling the driver to prevent the collision or to reduce its severity.

The braking apparatus 6 is employed by the PCS 1 when it is judged by the operation judgement apparatus 20 that there is some risk of collision with an obstacle, to increase the actuation force applied to the brake pedal of the host vehicle, i.e., to augment the strength of braking that is being applied by the vehicle driver, for thereby preventing the collision or to lessen the effects of the collision. If it is judged that the risk of collision with an obstacle has become substantially high, the braking apparatus 6 is employed by the PCS 1 to execute automatic braking of the host vehicle.

The seat belt apparatus 7 is a pre-tensioner apparatus, for applying tension to the webbing of the seat belts of the host vehicle. The seat belt apparatus 7 is used by the PCS 1 to execute such tensioning as part of preparatory measures, taken when it is judged that the risk of collision with an obstacle has become high. By taking up the slack in each seat belt before a collision occurs, the seat belt apparatus 7 ensures that the occupants of the host vehicle are retained securely before they can be projected forward, thereby enhancing protection of the occupants.

Operation Judgement Apparatus

As described above referring to FIG. 1B, the operation judgement apparatus 20 is based on a microcomputer together with a DSP (digital signal processor) 21. The DSP 21 executes high-speed FFT (Fast Fourier Transform) signal processing, etc, and is used to calculate the relative distance and direction angle (i.e., relative position), and relative speed, of each of respective target objects relative to the host vehicle, using the radar information obtained from the radar apparatus 2.

Specifically, each time that FMCW radar waves are transmitted and resultant reflected waves are received, in an increasing frequency/decreasing frequency pair of modulation periods, and beat signals of respective channels are thereby derived as described above, the DSP 21 performs FFT processing of the beat signals along the time axis, for each of the respective channels, for both of the increasing frequency/ decreasing frequency modulation periods. The DSP 21 thereby extracts a set of one or more peak amplitude values with respect to the frequency axis, referred to as peak frequencies, for each of the channels and for each of the (increasing frequency/decreasing frequency) modulation periods. For each of the channels, specific signal components (amplitude value and phase value) corresponding to each of the peak frequencies are extracted. A conventional type of DBF (Digital Beam Forming) processing is then applied to the extracted signal components from the respective channels, to estimate the direction angles relative to the host vehicle of each of respective target objects corresponding to the peak frequencies. For the purposes of this embodiment, such a direction angle is obtained as an azimuth angle between the position of the object and the advancement direction of the host vehicle.

Next, a type of processing referred to as pair matching processing is executed, to find "peak pairs" corresponding to respective target objects. Each peak pair consists of peak frequencies respectively corresponding to the increasing-frequency modulation period and the decreasing-frequency modulation period. The peak pairs are extracted based upon the respective results obtained for values of signal strength and direction angle corresponding to the peak frequencies, and upon historical (i.e., previously obtained and stored) values of these results. Any peak pair having a high probability of corresponding to a specific target object is extracted. The distance and relative speed of each of these target objects are then calculated, based upon the corresponding peak frequency values in the increasing-frequency and decreasing-frequency modulation periods. The values of distance, relative speed and direction angle thus obtained for each of the target objects are then supplied to the CPU of the operation judgement apparatus 20.

FIG. 3 is a flow diagram of a processing routine that is periodically executed by the CPU of the operation judgement apparatus 20 after the engine of the host vehicle is started, to implement the functions of the operation judgement apparatus 20. Firstly (step S110), processing is executed for receiving the radar information supplied from the radar apparatus 2 and the image information supplied from the imaging apparatus 3 as described above. Processing is then executed for receiving information referred to as intersecting object information, which is derived by the intersection judgement apparatus 10 as described hereinafter (step S120). The radar information received in step S110 is used by the DSP 21 to calculate the relative distance, speed and direction of each of respective target objects (pedestrians) specified in the intersecting object information.

Intersecting object information is derived for a target object by the intersection judgement apparatus 10 only when the object has been identified as a pedestrian who is detected as being within a region referred to as a vehicle out-width region, and who is moving laterally towards a condition of intersecting with the advancement of the host vehicle. The information also specifies the position (distance and direction angle with respect to the host vehicle) of the target object.

As illustrated in FIG. 2B, the vehicle out-width regions are obtained by subtracting a vehicle in-width region from the detection ranges of the radar apparatus 2 and the imaging apparatus 3. The vehicle in-width region extends from the front end of the host vehicle (i.e., along the direction of advancement of the vehicle), and has a width equal to the width of the host vehicle.

Next in step S130, target object confirmation processing is executed to confirm those target objects that are to be subjected to subsequent processing by the operation judgement apparatus 20. The target object confirmation processing is performed based on the radar information and image information acquired in step S110 and on the intersecting object information acquired in step S120 from the intersection judgement apparatus 10.

Specifically, in the target object confirmation processing of step S130, designating those objects which are detected based on the radar information and the image information as candidate target objects, these are separated into objects located within a vehicle out-width region and objects located within the vehicle in-width region. Any target object which is within a vehicle out-width region and has been judged (by the processing executed by the intersection judgement apparatus 10) to be a pedestrian who is moving laterally to intersect the advancement of the host vehicle (as indicated in the intersecting object information acquired in step S120), is then extracted. Next, these extracted objects (pedestrians), and any target object which is detected as being within the vehicle in-width region, are confirmed as objects to be subjected to subsequent processing by the operation judgement apparatus 20.

Even if only a part of an object is detected as being within the vehicle in-width region, the entire object is selected as being within the vehicle in-width region.

The following processing steps are then applied for each of the target objects which have been confirmed in step S130. Firstly (step S140) the direction and relative speed of the target object with respect to the host vehicle are calculated. With this embodiment, the calculation is based on changes in to the radar information and image information acquired for the target object in successive executions of step S110. However it would be equally possible to instead use a value of relative speed that is calculated by the DSP 21 based only on the radar information.

Next (step S150), the status information (acceleration, vehicle speed, steering angle, yaw rate) expressing the running conditions of the host vehicle are acquired from the status sensors 4. Based on the status information and the image information acquired from the imaging apparatus 3, a predicted travel locus of the host vehicle, and a vehicle speed vector (expressing the speed and direction of motion of the host vehicle) are calculated. The calculation may, for example, assume, that the vehicle will continue to run with speed and yaw rate remaining unchanged.

Following this (step S160), the speed at which the target object is advancing along its motion direction is calculated, from the relative speed value obtained in step S140. A judgement is then made as to whether it is possible that the target object will collide with the host vehicle. The judgement is made based upon a target object speed vector (expressing the speed and direction of motion of the target object) and the vehicle speed vector obtained in step S150. If it is judged that there is a possibility of a collision, the TTC is then calculated.

Next (step S170), if the TIC calculated in step S160 has become shorter than a predetermined first threshold interval, it is judged that there is a comparatively high probability of collision between the host vehicle and the target object, whereas if the TTC is longer than the first threshold interval, it is judged that the probability of collision is low. If the TTC has become shorter than a predetermined second threshold interval (shorter than the first threshold interval), then it is judged that the probability of collision between the host vehicle and the target object has become substantially high.

Following this (step S180), if it has been judged that there is a comparatively high probability that the host vehicle will collide with the target object, a first stage of vehicle control processing is executed. With this, warning sounds, warning messages and warning images are generated by the warning apparatus 5, a braking force applied by the vehicle driver is augmented by the braking apparatus 6, and the seat belt webbing is tightened by the seat belt apparatus 7, as preparatory operations.

However if it is judged that the probability of collision with the target object has become substantially high, a second stage of vehicle control processing is executed, whereby the braking apparatus 6 performs automatic braking of the host vehicle, to avert the collision or reduce the impact of the collision.

Intersection Judgement Apparatus

Figure 1B:
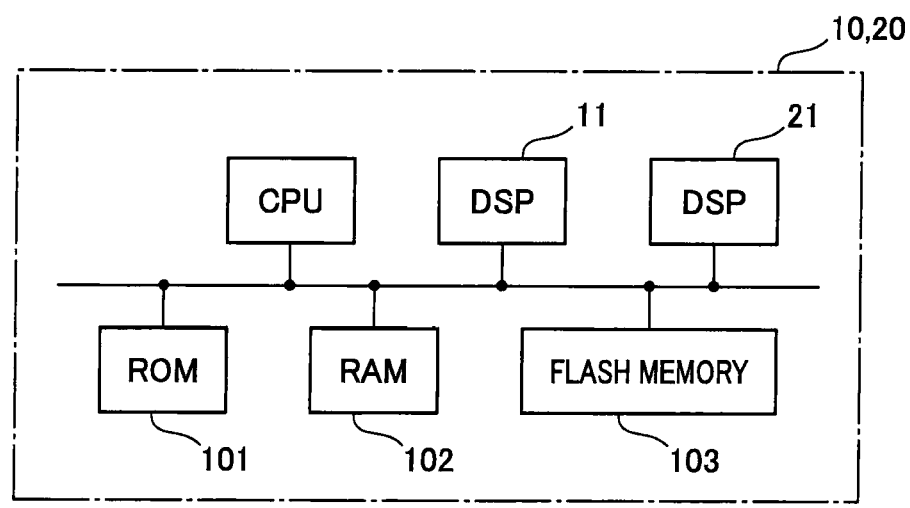
FIG. 1B is a block diagram of the intersection judgement apparatus of FIG. 1A.

As shown in FIG. 1B, the intersection judgement apparatus 10 is based on the same microcomputer as for the operation judgement apparatus 20, however the intersection judgement apparatus 10 also utilizes the DSP 11. The DSP 11 receives radar information (beat signals) from the radar apparatus 2 and calculates the relative speed, distance and direction angle of respective target objects based on the radar information, and supplies the calculation results to the CPU 100 of the microcomputer.

Figure 4:
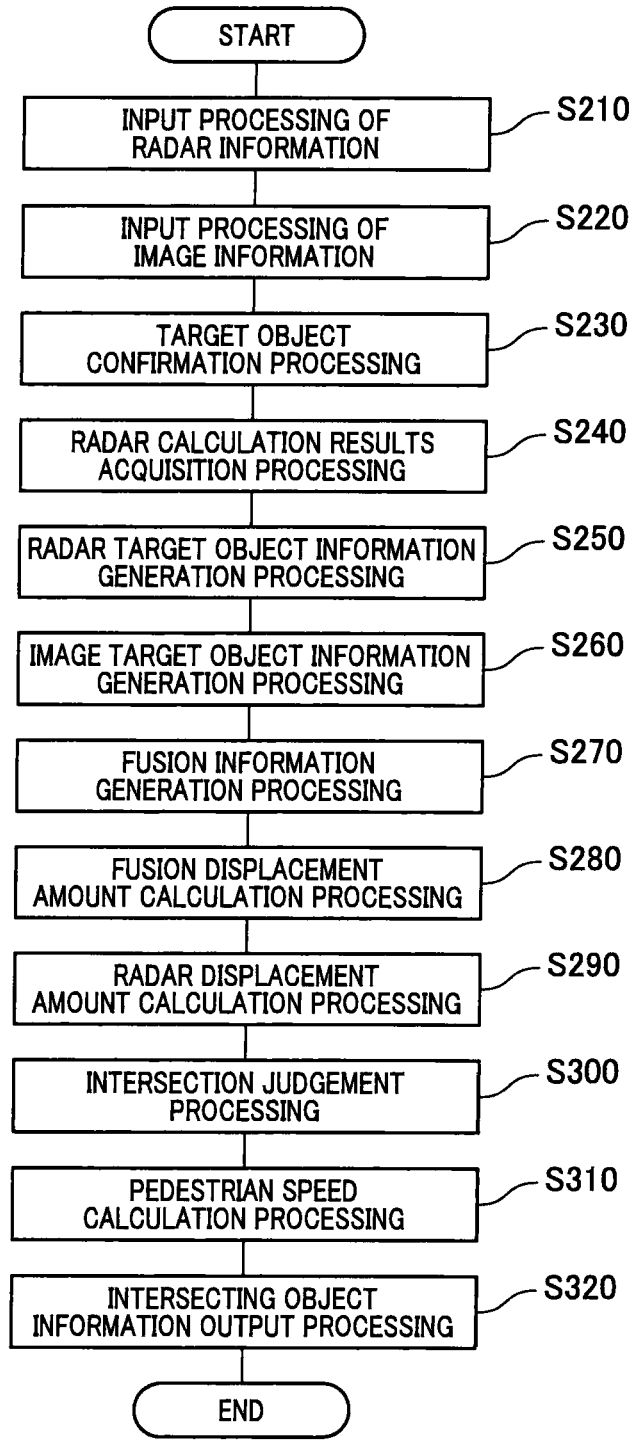
FIG. 4 is a flow diagram of a processing routine executed by the intersection judgement apparatus.

An intersection judgement processing routine which is repetitively executed by the intersection judgement apparatus 10 will be described referring to the flow diagram of FIG. 4. Executions of the routine are commenced when the engine of the host vehicle is started. Firstly (step S210) updated radar information is acquired from the radar apparatus 2 and (step S220) updated image information is acquired from the imaging apparatus 3.

Next, (step S230) based on the acquired radar information and image information, target object confirmation processing is executed, for determining those detected objects which will be subjected to subsequent processing by the intersection judgement apparatus 10.

Specifically, the target object confirmation processing first extracts candidate target objects. Each candidate target object is an object which is indicated (as described above) by the image information inputted in step S220 and also by the radar information inputted in step S210. The candidate target objects are then categorized into those located within a vehicle out-width region and those within the vehicle in-width region. A known type of image processing such as pattern-matching processing is then applied to the image information obtained in step S220, to identify any candidate target object which is a pedestrian who is within a vehicle out-width region. Such a target object (referred to in the following as a confirmed-target pedestrian) is selected to be subjected to subsequent processing by the intersection judgement apparatus 10.

Next in step S240, if a confirmed-target pedestrian has been detected, radar calculation results acquisition processing is executed by the DSP 21 to obtain calculated values of distance, speed and direction angle of the confirmed-target pedestrian relative to the host vehicle, based on the radar information (beat signals) acquired in step S210.

Processing is then executed (step S250) to obtain information referred to as the radar target object information. This expresses the distance and lateral position of the confirmed-target pedestrian with respect to the position and advancement direction of the host vehicle, and is obtained from the calculation results derived by the DSP 21 from the radar information in step S240.

"Lateral position" of a target object, as used herein, signifies the distance between the target object and the advancement direction of the host vehicle, as measured at right angles to that advancement direction.

The radar target object information is periodically updated with a repetition period of T1 sec, i.e., the repetition period of generating updated radar information by the radar apparatus 2.

Next (step S260), image target object information generating processing is applied to the image information that was inputted in step S220, based on known types of image processing such as edge extraction processing. The image target object information expresses calculated values of distance and lateral position of the confirmed-target pedestrian with respect to the host vehicle, and is obtained based on the position (i.e., horizontal and vertical position coordinates) of the pedestrian within a captured image.

Updated image target object information is generated once in every T2 seconds, i.e., the repetition period of generating updated image information by the imaging apparatus 3.

Next (step S270), fusion information generating processing is executed, is which combines the radar target object information generated in step S250 with the image target object information generated in step S260. This will be described referring to FIG. 5, in which distance values relative to the host vehicle are plotted along the vertical axis and lateral position values along the horizontal axis. A radar position error region is defined by adding predetermined assumed amounts of position error (each expressed by a distance error and a lateral position error amount) to a position that has been obtained for a target object based on the radar target object information. Similarly, an image position error region is defined by adding predetermined assumed amounts of position error (each expressed by a distance error and a direction angle error amount) to a position calculated for a target object based on the image target object information. In this case, each direction angle value is obtained by dividing a distance value by a corresponding lateral position value.

If the image position error region and the radar position error region mutually overlap at least partially (thereby indicating that the image target object information and the radar target object information correspond to a single detected object) the target object position is obtained by combining the respective positions derived from the radar target object information and image target object information respectively. Such combined information is referred to as fusion information. Specifically as illustrated in FIG. 5, a fusion position is obtained which is expressed by a distance value obtained from the radar target object information and a lateral position value calculated by dividing the distance value obtained from the radar target object information by a direction angle value obtained from the image target object information.

Figure 5:
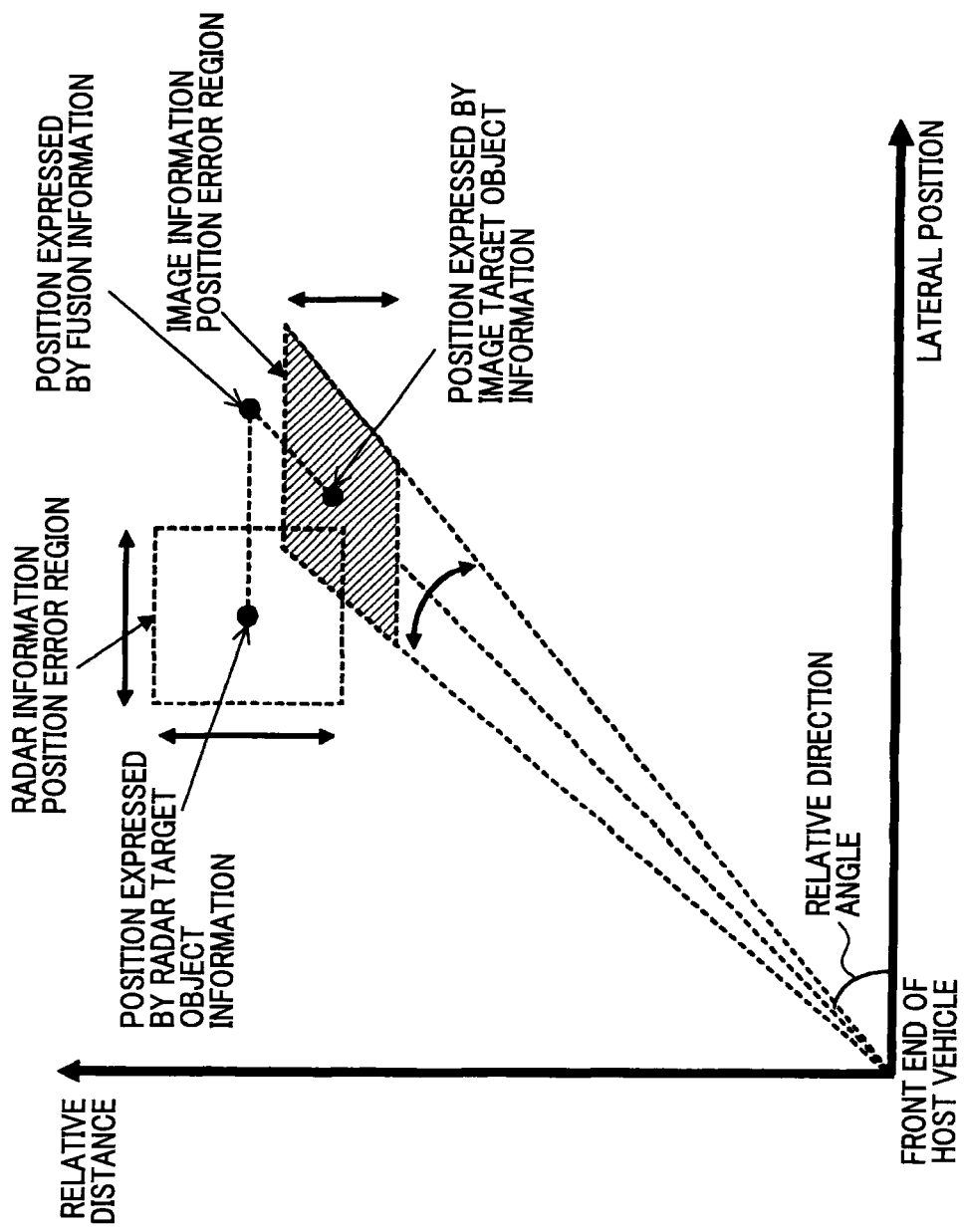
FIG. 5 is a diagram for describing fusion information derived by the embodiment.

As an alternative to the method illustrated in FIG. 5, it would be possible to use the fusion information to obtain a fusion position for a target object (confirmed-target pedestrian) only when the separation between the target object positions derived from the radar target object information and from the image target object information, respectively, does not exceed a predetermined error amount.

With this embodiment, the fusion information for a confirmed-target pedestrian is updated (fusion position is calculated) once in every T2 seconds, i.e., the repetition period of obtaining updated image information.

Next (step S280), fusion displacement amount calculation processing with respect to the confirmed-target pedestrian is executed. In this processing, a lateral displacement amount is calculated as the difference between the respective lateral positions of the currently obtained and precedingly obtained fusion positions (i.e., derived in successive executions of step S270). Hence this lateral displacement amount is the distance by which the confirmed-target pedestrian has moved laterally towards the advancement direction of the host vehicle in the latest (T2 sec) period, as obtained using the fusion information.

Next (step S290), radar displacement amount calculation processing is executed. In this processing, a lateral displacement amount is calculated as the difference between respective lateral positions obtained for the confirmed-target pedestrian from the radar target object information in the current execution and the preceding execution of step S250, respectively.

Intersection judgement processing is then executed (step S300) for judging whether the confirmed-target pedestrian is moving laterally such as to intersect with the advancement of the host vehicle. The judgement is performed based on a plurality of calculation results that have been obtained up to the present point by successive executions of steps S280 and S290, as described in the following.

In addition (step S310), pedestrian speed calculation processing is executed, for calculating a motion speed of the confirmed-target pedestrian. With this embodiment, the speed is calculated as an average amount of lateral displacement occurring in each period (T2 or T1 sec), by taking the average of a currently obtained lateral displacement value (calculated in step S280 or S290) and at least one precedingly obtained lateral displacement value.

Finally (step S320), intersecting object information is outputted to the operation judgement apparatus 20. The intersecting object information expresses the position of the confirmed-target pedestrian (as a distance and direction angle, relative to the host vehicle), and also expresses (as indicated by the state of a flag bit) the result of the judgement of step S300, as to whether the confirmed-target pedestrian is becoming laterally displaced such as to intersect with the advancement of the host vehicle.

Intersection Judgement Processing

The intersection judgement processing executed in step S300 is illustrated by the logic block diagram of FIG. 6.

In the intersection judgement processing, the CPU 100 of the intersection judgement apparatus 10 (by executing a stored program) judges whether all of a set of conditions designated as the operation conditions (a) to (d), illustrated in FIG. 6, are satisfied. If all of these operating conditions are satisfied with respect to a confirmed-target pedestrian, (and only if that is the case), then it is judged that the pedestrian is moving laterally such as to intersect with the advancement of the host vehicle.

When a condition shown in FIG. 6 becomes satisfied, a corresponding flag bit is changed from the logic 0 to 1 state. When all of the conditions become satisfied (i.e., an AND judgement) this is taken to indicate that the confirmed-target pedestrian is moving laterally such as to intersect with the advancement of the host vehicle.

In the case of operation condition (a), the CPU of the intersection judgement apparatus 10 compares the motion speed of the confirmed-target pedestrian as calculated in step S310 with a predetermined threshold value V1. This is a lower limit value, predetermined such that if the pedestrian is detected as moving at a speed higher than V1, it can be reliably considered that the pedestrian is not stationary. The operation condition (a) is satisfied only when the detected speed of the confirmed-target pedestrian exceeds V1.

The CPU of the intersection judgement apparatus 10 further judges whether fusion information has been generated in step S270 for the confirmed-target pedestrian. The operation condition (b) is satisfied only when fusion information has been generated. More specifically with this embodiment, condition (b) is satisfied if fusion information has been generated with respect to the confirmed-target pedestrian for the duration of a predetermined interval (with this embodiment, T2 sec) at least once.

Three combinations of threshold values, referred to as threshold condition groups, are used to evaluate the operation condition (c), as described in the following.

The lateral displacement amounts obtained for the confirmed-target pedestrian based on the successively calculated fusion positions (these amounts being referred to in the following as No. 1 lateral displacement amounts) are compared with three threshold values, designated as the first, second and third lower displacement thresholds, respectively corresponding to first, second and third threshold condition groups. A timing at which an updated No. 1 lateral displacement amount is calculated (in an execution of step S280) will be referred to as a displacement calculation timing.

At each displacement calculation timing, the intersection judgement apparatus 10 compares the updated No. 1 lateral displacement amount (e.g., measured in units of meters) with each of the first, second and third lower displacement thresholds, whose respective values are designated as A m, B m and C m, where A<B<C. In particular with this embodiment, the intersection judgement apparatus 10 judges whether the displacement amount is within one or more of three displacement ranges, respectively corresponding to the three lower displacement threshold values. Each displacement range extends between the corresponding lower displacement threshold and a displacement limit threshold D m, which is identical for each range and is higher than each of three lower displacement threshold values.

If a No. 1 lateral displacement amount is greater than C m and less than D m, then it is within the displacement ranges corresponding to each of the first, second and third lower displacement thresholds. If it is greater than B m and less than C m, then it is within each of the displacement ranges respectively corresponding to the first and second lower displacement thresholds, and is outside the displacement range corresponding to the third lower displacement thresholds. If the No. 1 lateral displacement amount is greater than A m and less than B m, then it is within the displacement range corresponding to the first lower displacement threshold, and is outside each of the displacement ranges corresponding to the second and third lower displacement thresholds.

Figure 7A:
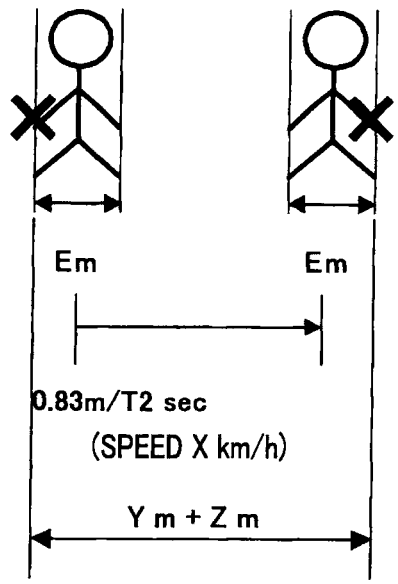
FIG. 7A is a diagram for describing the derivation of an upper limit threshold value used in the intersection judgement processing.

Designating X m/sec as a speed generally considered to be the highest walking speed of a person, designating Y m as the distance which will be traversed in T2 sec when walking at X km/h, and designating Z m as the width (as measured between extended right hand and left hand) of the person, then as illustrated in FIG. 7A, the displacement limit threshold D m is obtained by adding a suitable margin amount to (Y+Z) m.

Figure 7B:
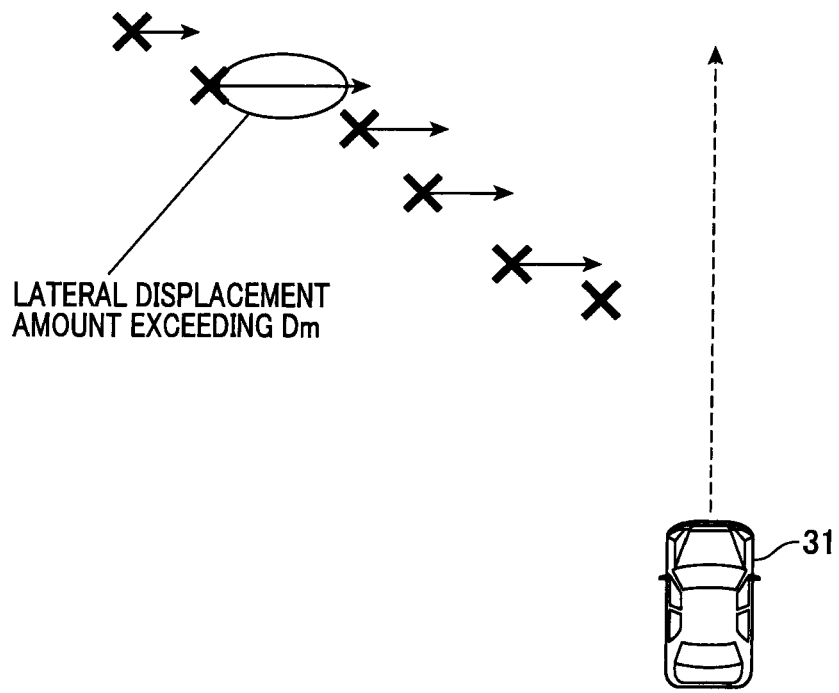
FIG. 7B is a diagram for describing an effect of the upper limit threshold upon a counting operation.

If the No. 1 lateral displacement amount exceeds the displacement limit threshold D m and so is judged to be outside all of the displacement ranges, then as illustrated in FIG. 7B, that lateral displacement is not counted in a count operation described in the following.

Each threshold condition group consists of the corresponding lower displacement threshold (or in the case of the present embodiment, the corresponding displacement range defined between a corresponding lower displacement threshold and a displacement limit threshold) and a corresponding count threshold designated as L. A count range designated as M is also predetermined, as described in the following.

A threshold condition group becomes satisfied when the number of times that sequentially obtained lateral displacement amounts exceed the corresponding lower displacement threshold (or, in the case of the present embodiment, come within the corresponding displacement range) exceeds the corresponding count threshold L, within a number of consecutive displacement calculation timings that does not exceed the count range M. With this embodiment, an identical value (5) of count range M is applied for all of the threshold condition groups.

In the present description and in the appended claims, it is to be understood that a distinction is made between the terms "sequential" and "consecutive". Specifically, events may occur sequentially (at respective sequential ones of a series of periodic time points), while not occurring consecutively (at respective consecutive ones of the series of time points).

Thus to evaluate each of the threshold condition groups, the intersection judgement apparatus 10 counts the number of displacement calculation timings at which the first displacement amount comes within the corresponding displacement range, and judges whether the count attains the corresponding count threshold L during a number of consecutive displacement calculation timings that does not exceed the count range M.

When all of the three threshold condition groups have become satisfied (concurrently or sequentially) within a range of N consecutive displacement calculation timings (where N≥M i.e., with this embodiment N≥5, and specifically is set as 7), the operation condition (c) is judged to be satisfied.

Alternatively stated, designating the interval between successive displacement calculation timings as a displacement update period, the operation condition (c) is judged to be satisfied if the delay between a time point at which a first one of the threshold condition groups becomes satisfied and a subsequent point at which all of the threshold condition groups have become satisfied does not exceed a predetermined amount, i.e., with the present embodiment, does not exceed two displacement update periods.

Figure 8A:
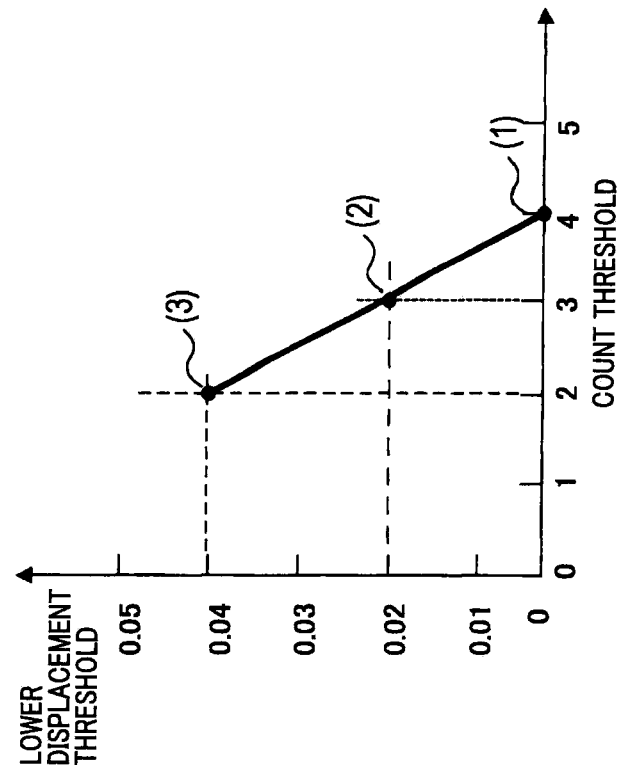
FIG. 8A is a graph showing the relationship between values of a lower displacement threshold and a count threshold, for respective threshold condition groups which operate on fusion information.

Respectively different values of count threshold are assigned to the first, second and third threshold condition groups. The higher the value of the lower displacement threshold that is assigned, the lower is made the corresponding is count threshold. This is illustrated in FIG. 8A, concerning the threshold condition groups to which lateral displacement amounts obtained from the fusion information are applied (for evaluating operation condition (c) in FIG. 6). As shown in FIG. 8A, the count threshold is 4 for the first threshold condition group (lower displacement threshold value zero), is 3 for the second threshold condition group (lower displacement threshold value 0.04), and is 2 for the third threshold condition group (lower displacement threshold value 0.08).

Thus as shown in FIG. 8A there is a linear relationship between the values of the corresponding lower displacement thresholds and the values of the corresponding count thresholds, in the plurality of threshold condition groups.

Figure 9B:
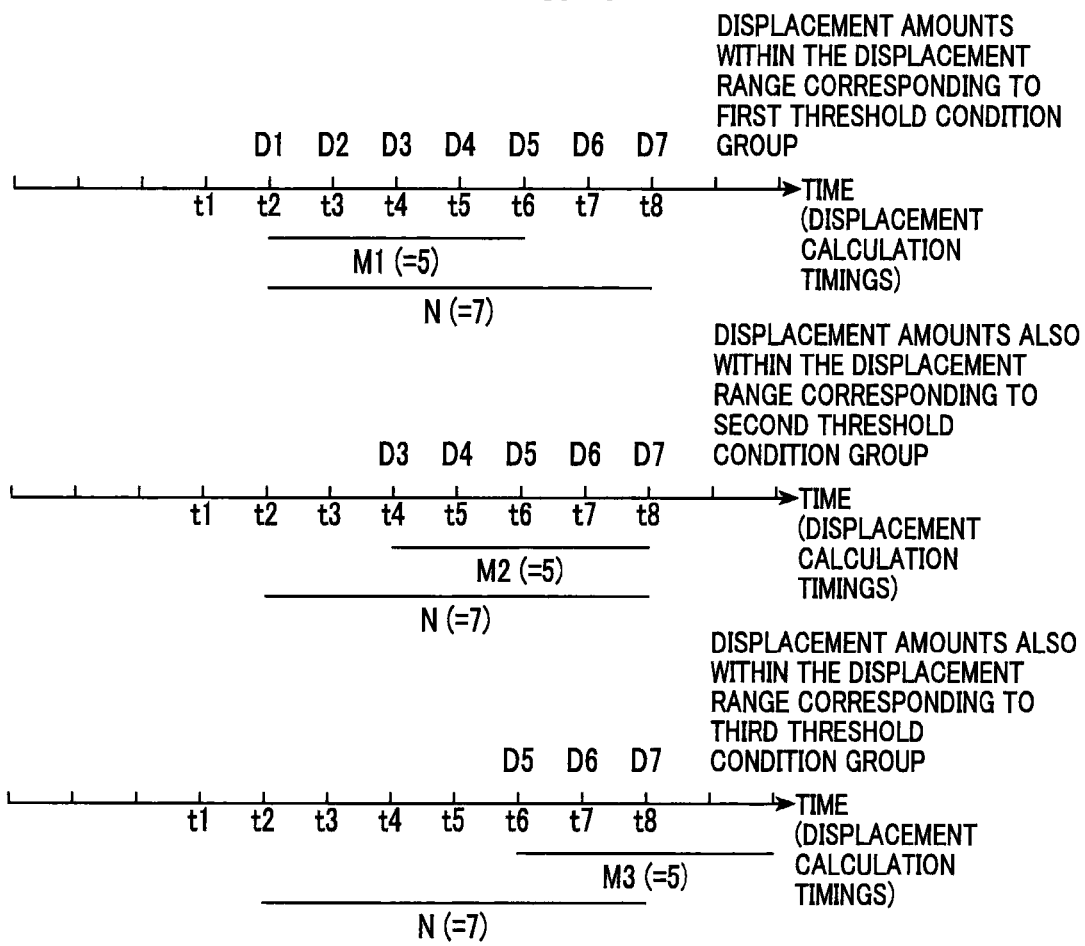
FIG. 9B is a corresponding timing diagram showing an example of timing relationships of count ranges applicable in the example of FIG. 9A.

The manner in which the operation condition (c) becomes satisfied will be described referring to a specific example shown in FIGS. 9A and 9B, assuming that the value N is 7, the count range M is 5, and the displacement ranges corresponding to the first, second and third threshold condition groups are from 0 m to D m, from 0.04 m to D m, and from 0.08 m to D m, respectively. In the upper part of FIG. 9A lateral positions of a confirmed-target pedestrian are plotted along the vertical axis (with decreasing values of lateral position corresponding to increasing closeness to the advancement direction of the host vehicle, i.e., decreased lateral distance) and values of elapsed time along the horizontal axis.

At a displacement calculation timing indicated as t1, a large amount of lateral displacement (towards the advancement direction of the host vehicle) is calculated. The magnitude of the displacement exceeds the displacement limit threshold Dm, and so that occurrence is not counted.

The count thresholds are respectively 4, 3 and 2 for the first, second and third threshold condition groups, as shown in FIG. 8A. It is assumed that the first threshold condition group becomes satisfied at the displacement calculation timing t5 as shown in the lower part of FIG. 9A, being attained within the count range M1 shown in FIG. 9B. Similarly, the second and third threshold condition groups become respectively satisfied at the timings t6 (when a count of 3 is attained for the second threshold condition group, in the count range M2) and t7 (when a count of 2 is attained for the third threshold condition group, in the count range M3).

When all of the three threshold condition groups have thus become satisfied at the timing t7, by counting executed within a range of consecutive calculation timings equal to N (7), a flag bit corresponding to the target object (confirmed-target pedestrian) is set to the 1 state, indicating that condition (c) has been satisfied.

Figure 8B:
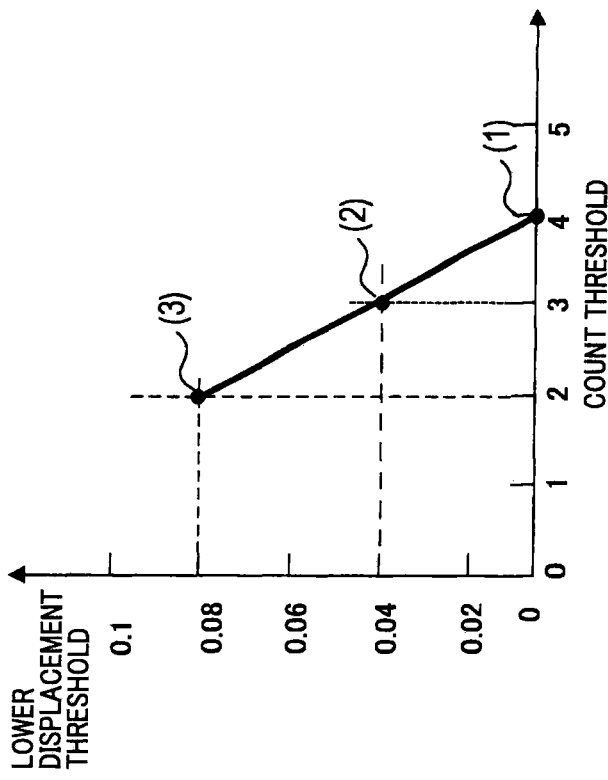
FIG. 8B is a graph showing the relationship between values of the lower displacement threshold and count threshold, for respective threshold condition groups which operate on radar information.

The processing for judging the operation condition (d) is then executed. This is essentially similar to that for operation condition (c) described above, so that detailed description is omitted. The evaluation of condition (d) differs in that each lateral displacement amount is obtained from the radar displacement amount information calculated in step S290. In this case, each lateral displacement amount (updated periodically with the repetition period T1 sec, i.e., half of the period T2) is referred to as a No. 2 lateral displacement amount. In addition, the value of the count range M is made twice the value used in evaluating condition (c), and the value of the displacement limit threshold D is made half of that used in evaluating condition (c). Furthermore as shown in FIG. 8B, the values of the first, second and third lower displacement thresholds are respectively set as 0 m, 0.02 m (i.e., 0.04 m/2) and 0.04 m (i.e., 0.08 m/2).

Hence with this intersection judgement processing, only if:
a confirmed-target pedestrian is judged to be in motion at a speed exceeding V1 km/h, so that operation condition (a) is satisfied; and fusion information has been generated for that pedestrian at least once for a predetermined duration, so that operation condition (b) is satisfied; and
each of the plurality of threshold condition groups evaluated based on the fusion displacement amount information have become satisfied, so that operation condition (c) has become satisfied; and
the plurality of threshold condition groups evaluated based on the radar displacement amount information have become satisfied, so that operation condition (d) has become satisfied;
then it is judged that the confirmed-target pedestrian is moving laterally to intersect with the advancement of the host vehicle.

Effects

With the PCS 1 of the embodiment described above, when one or more target objects are located in an external region to the side of the advancement direction of the host vehicle, the intersection judgement apparatus 10 selects only a confirmed target object identified as being a pedestrian, who is judged to be moving laterally towards a condition of intersection with the advancement of the host vehicle.

Information specifying the position, etc., of such a pedestrian is supplied to the operation judgement apparatus 20 (intersection object information, received in executions of step S120 of FIG. 3). The operation judgement apparatus 20 estimates the probability that the host vehicle may collide with the pedestrian, based upon the relative speed, relative distance and direction angle of the pedestrian in conjunction with the predicted locus of the host vehicle.

As illustrated in FIG. 6 above, the intersection judgement apparatus 10 judges whether all of a plurality of operation conditions (a) to (d) are satisfied with respect to a confirmed-target pedestrian. These operation conditions can be summarized as follows:

Operation condition (a) is satisfied if it is detected that the confirmed-target pedestrian is actually in motion, i.e., an average speed of motion of the pedestrian exceeds a predetermined minimum threshold.

Operation condition (b) is satisfied if fusion information has been generated with respect to the confirmed-target pedestrian. Generation of fusion information indicates that a position obtained based on radar information and a position obtained based on image information correspond to the same target object.

The requirements for satisfying operation condition (c) (judged based on image information) or operation condition (d) (judged based on image information) are evaluated with respect to a detected pedestrian as follows. At each displacement calculation timing (occurring with an update period T1 in the case of the radar information and T2 in the case of the image information), the intersection judgement apparatus 10 judges (for each of the first, second and third threshold condition groups) whether the pedestrian has become laterally displaced (since the preceding timing) by an amount exceeding the lower displacement threshold corresponding to the threshold condition group, and if so, whether that circumstance has occurred for a number of times which attains the count threshold L corresponding to that threshold condition group, within the count range M.

The higher the value of the lower displacement threshold corresponding to a threshold condition group, the lower is made the corresponding count threshold L.

As illustrated conceptually in FIG. 6, if all of the operation conditions (a), (b), (c) and (d) have been satisfied with respect to a confirmed-target pedestrian, i.e., if an AND condition is satisfied for that set of operation conditions, then it is judged that the pedestrian is moving laterally to intersect with advancement of the host vehicle.

The operation conditions (c) and (d) of the above embodiment differ basically from the prior art as follows. The requirements which must be satisfied before measures such as warning indications, automatic braking, etc., are applied (in response to a target object) will be referred to as the "warning requirements". With the present invention, instead of making the warning requirements more relaxed or more severe simply by altering a single threshold value, one or more combinations of a plurality of different threshold values are utilized, such a combination being referred to as a threshold condition group. With a threshold condition group, one threshold value (e.g., the lower displacement threshold) can be lowered, with another threshold (the count threshold) being increased accordingly. This allows judgement based on a plurality of threshold condition groups having respectively different values of lower displacement threshold and respectively different values of the count threshold.

Reliable judgement can thereby be achieved, as to whether a target object is becoming laterally displaced along a specific direction, even if the view of the object (by a radar apparatus and/or imaging apparatus) is intermittently obstructed.

With the prior art on the other hand, such a judgement operation is performed independently for each of a succession of obtained displacement amounts (i.e., by simply comparing each displacement amount with a single threshold value).

Furthermore with the present invention, the judgement is preferably made based upon whether all of a plurality of such respectively different threshold condition groups become satisfied (i.e., an AND decision). This is preferable to making a decision based on whether at least one condition is satisfied (i.e., an OR decision) for the following reasons. With the above embodiment, a decision is made that a target object is being displaced laterally such as to intersect with the advancement of the host vehicle only if a large number of successive amounts of lateral displacement have been obtained for the target object, including at least an appropriate minimum number of large amounts of lateral displacement (i.e., intervals in which the target object has become rapidly displaced). Hence high accuracy of judgement is achieved.

On the other hand, a decision that a target object is being displaced to laterally in the intersection direction will be reached only if all a plurality of respectively different threshold condition groups become satisfied. Hence the possibility of generating unnecessary warning indications, etc., becomes reduced, i.e., the "off performance" is improved.

Furthermore with the above embodiment (operation condition (c)), the intersection judgement apparatus 10 obtains successive displacement amounts for a target object based on successive positions of the object (fusion positions) each obtained from radar information and from image information in combination. That is, such a position is obtained by combining a relative distance value which is derived based on radar information generated by the radar apparatus with a relative direction angle which is derived based on image information generated by the imaging apparatus.

This has the following advantage. The distance of an object which reflects radar waves can in general be accurately measured by a radar apparatus. However since the radar waves will be reflected from various different parts of the object, if the object has significant width, the accuracy of measuring the relative direction angle of the object based on the reflected waves is low, and in addition it is possible that two or more mutually adjacent objects may be erroneously detected as a single object.

In the case of a camera-based imaging apparatus on the other hand, the accuracy of measuring the distance of an object which appears within images captured by the apparatus is relatively poor. However since the actual object is portrayed in the captured images, the accuracy of measuring the direction angle of the object is relatively high. Hence, relatively high accuracy can be achieved in estimating the lateral position of the object with respect to the host vehicle.

Thus with the above embodiment, the respective advantages of radar information and image information are combined when estimating the position of a target object. Improved reliability is thereby achieved in judging whether a target object is moving laterally to intersect with the advancement of the host vehicle.

In particular, use of the fusion information (to obtain a position based on radar information and image information in combination) is effective in preventing a detection error whereby two different objects are detected as a single object based on radar information alone, or when one object is detected based on the radar information and the other object is detected based on the image information and these are taken as corresponding to a single object.

Furthermore with the above embodiment, not only is judgement performed based on a plurality of threshold condition groups applied to lateral displacement amounts derived from the fusion information, but judgement is also performed based on a plurality of threshold condition groups which are applied to lateral displacement amounts derived only from the radar information. A decision that a target object (pedestrian) is in danger of crossing the advancement direction of the host vehicle can be reached only if both of these two pluralities of threshold condition groups become satisfied with respect to that target object. This serves to further prevent erroneous judgement caused by two different objects being detected as a single object.

Furthermore with the above embodiment, in addition to each threshold condition group having a corresponding value of lower displacement threshold, a displacement limit threshold is applied in common for all of the threshold condition groups. Thus each threshold condition group has a corresponding displacement range, and is satisfied only when lateral displacement amounts come within that range, i.e., if a lateral displacement amount calculated for a target object exceeds the displacement limit threshold, that event is ignored.

The value of the displacement limit threshold is determined in accordance with the type of object to be detected, i.e., in accordance with the maximum rate of speed that may be expected for that type of object. This further improves the reliability of judgement. For example, if two persons are erroneously detected as a single target object based on the radar information and/or the image information, the two persons may subsequently become detected as separate objects. Alternatively, a single person may become detected as a pair of objects. This can result in large values of lateral displacement being erroneously obtained. However the displacement limit threshold serves as a fail-safe measure for ensuring that such excessive magnitudes of lateral displacement will be ignored.

Moreover with the above embodiment, even if each of the above-described operating conditions (b), (c) and (d) are judged to be satisfied with respect to a detected pedestrian, the intersection judgement apparatus 10 will not judge that the pedestrian is moving such as to intersect with the advancement of the host vehicle, if the estimated motion speed of the pedestrian (calculated average speed) is below a predetermined minimum value, i.e., if the operation condition (a) is not satisfied.

This serves as a fail-safe measure, to protect against the possibility that the operating conditions (b), (c) and (d) might accidentally become satisfied with respect to a target object which is not actually in motion.

With the above embodiment as described referring to FIG. 1B, the functions of the intersection judgement apparatus 10 are implemented by the CPU 100 of a computer, in executing steps of a program that is held stored in a non-volatile memory (ROM 101 or flash memory 103) of the computer, in conjunction with operations executed by the DSP 11. The functions of the operation judgement apparatus 20 are also implemented by the CPU 100, in executing steps of a stored program, but in conjunction with operations executed by the DSP 21.

The above embodiment relates to features of the appended claims as follows. The radar apparatus 2 and the imaging apparatus 3 correspond to target object detection means. Distance measurement circuitry and direction angle measurement circuitry are implemented by the DSP 21 in executing the contents of step S240, in conjunction with the CPU 100 of the computer in executing the processing steps S250 and S260. Displacement amount calculation circuitry is implemented by the CPU 100 of the computer in to executing the processing steps S270, S280 and S290. Intersection judgement circuitry is implemented by the CPU 100 of the computer in executing the processing step S300.

Other Embodiments

The scope of the invention is not limited to the above embodiment, and various modifications or alternative embodiments may be envisaged.

Figure 10A:
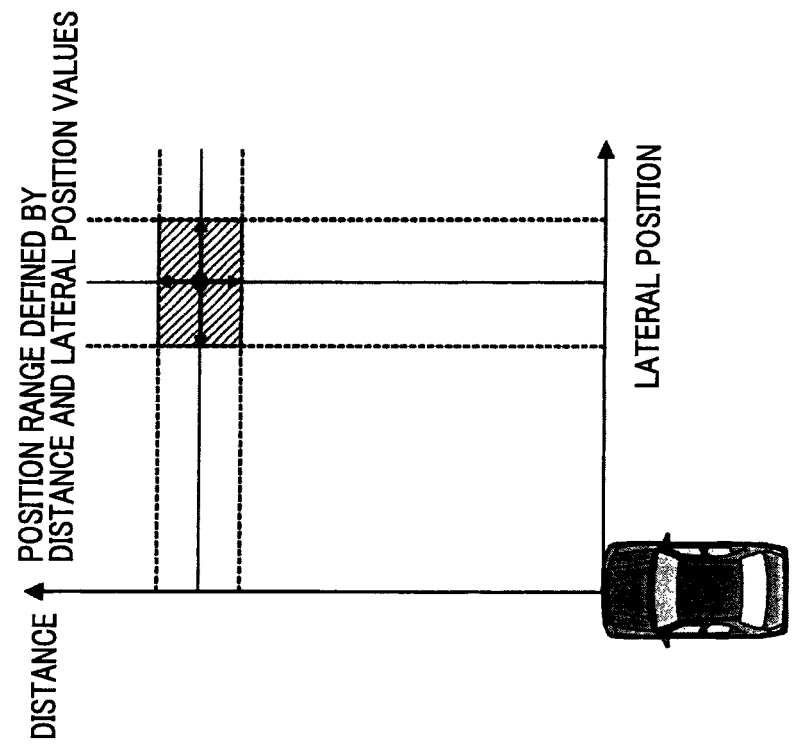
FIGS. 10A and 10B are diagrams for use in describing an alternative method of establishing position error regions which are shown in FIG. 5.

For example with the above embodiment, in the fusion information generating processing step S270 (illustrated in FIG. 5), the image position error region is established as shown in FIG. 10A. In that case, the image position error region is obtained by adding assumed amounts of distance error and direction error (angular error) respectively to a distance value and direction value that are obtained for the target object from the image information. However it would be equally possible to obtain the image position error region as shown in FIG. 10B, by adding assumed amounts of distance error and lateral displacement error respectively to a distance value and lateral displacement value that are obtained for the target object from the image information.

Figure 10B:
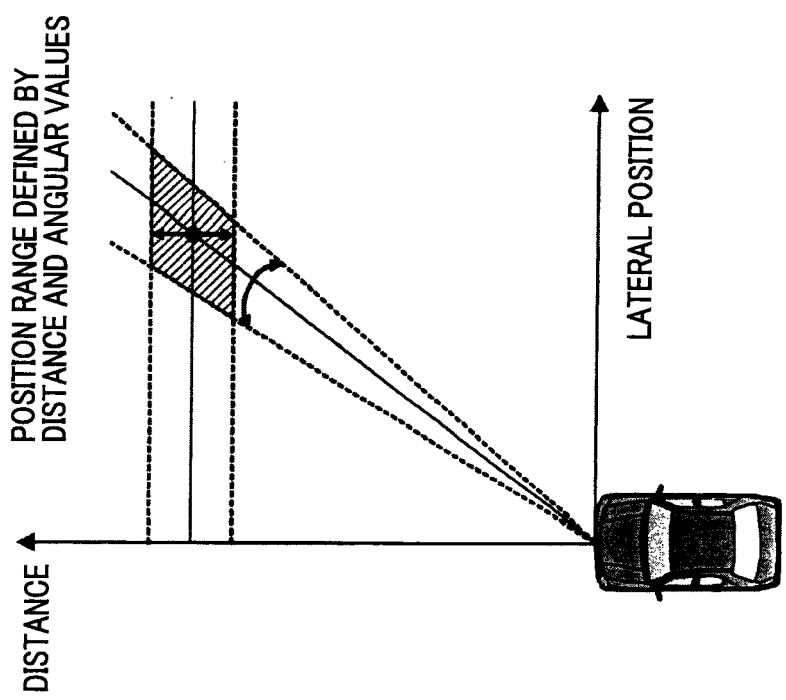

As another alternative, it would be possible to select either the method of FIG. 10A or that of FIG. 10B to establish the image position error region, in accordance with values of distance and lateral position which are obtained for the target object based on the image information. For example the apparatus could operate such that when the distance from the host vehicle is large, or when that distance is comparatively large and the lateral position of the target object is large, the method of FIG. 10A would be selected for establishing the image position error region. Conversely, when the distance of the target object from the host vehicle is judged to be small, or that distance is comparatively small and the lateral position of the target object is small, the method of FIG. 10B would be selected for establishing the image position error region.

Furthermore with the above embodiment, a decision is made in the intersection judgement processing (step S300) that the operating condition (c) is satisfied only if all of the plurality of threshold condition groups of operation condition (c) are satisfied, i.e., if an AND condition is met. That is also true for the operation condition (d). However it would be possible to configure the apparatus such that the operation condition (c) or operation condition (d) is satisfied if at least one of the plurality of threshold condition groups is satisfied, i.e., if an OR condition is met.

Furthermore with the above embodiment, the intersection judgement apparatus 10 judges in the target object confirmation processing (step S230) that only a pedestrian who is positioned within a vehicle width-external region with respect to the host vehicle will be selected for subsequent processing. However the invention is not limited to this, and the intersection judgement processing of the above embodiment (step S300) could be applied to types of target object other than pedestrians, such as motor vehicles positioned within a vehicle width-external region. In that case, the values set for the respective lower displacement thresholds and the displacement limit threshold, of the pluralities of threshold condition groups constituting the operation conditions (c) and (d), would be determined appropriately in accordance with the type of target object (e.g., motor vehicle) to be judged.

Moreover the above embodiment has been described only for the case in which the intersection judgement processing (step S300) judges whether a pedestrian is moving laterally such as to intersect with the advancement of the host vehicle (i.e., while the vehicle is being driven forward). However the invention is equally applicable to motion of the host vehicle in reverse. That is, the intersection judgement processing could also judge a target object such as a pedestrian who is located in a vehicle width-external region at the rear of the host vehicle, while the vehicle is being driven in reverse.

Furthermore with the above embodiment, there is a linear relationship between the respective values of lower threshold of a plurality of threshold condition groups and the respective values of count threshold of these threshold condition groups (as illustrated in FIGS. 8A, 8B). However it would be equally possible to use a non-linear relationship, so long as it is ensured that the greater the value of the lower threshold of a threshold condition group, the smaller is made the value of the corresponding count threshold.

Moreover the invention is not limited to judgement based on evaluating the respective statuses (satisfied/non-satisfied) of a plurality of threshold condition groups. It would be possible to make a judgement in accordance with is whether or not a single threshold condition group is satisfied.

What is claimed is:

1. An intersection judgement apparatus incorporated in a PCS (pre-crash system) of a host vehicle for assisting the PCS to calculate a TTC (time to collision) with a target object, the intersection judgement apparatus comprising distance measurement circuitry configured for receiving target object detection information from target object detection means, and for periodically calculating updated values of a relative distance between the host vehicle and a target object based on the target object information, the target object information relating to an object positioned within an external region located ahead of the host vehicle and to one side of a longitudinal motion direction of the host vehicle;

direction angle measurement circuitry configured for periodically calculating updated values of a direction angle of the target object relative to the host vehicle, based on the target object detection information, displacement amount calculation circuitry configured for periodically calculating updated amounts of lateral displacement of the target object based upon respective values of the calculated relative distance and calculated direction angle of the target object, each lateral displacement amount being measured along a lateral direction which is at right angles to longitudinal motion direction of the host vehicle, and intersection judgement circuitry configured for applying the periodically calculated lateral displacement amounts in judgement processing for judging whether the target object is moving substantially continuously along the lateral direction;

wherein:

the intersection judgement circuitry is configured to:

execute the judgement processing based on utilizing a plurality of threshold condition groups, each threshold condition group comprising a combination of a corresponding lower displacement threshold and a corresponding count threshold having respectively predetermined values, the corresponding lower displacement thresholds of the threshold condition groups being respectively different and the corresponding count thresholds of the threshold condition groups being respectively different;

apply each of the threshold condition groups in an operation of counting a number of times that sequential ones of the lateral displacement amounts exceed the corresponding lower displacement threshold of the threshold condition group, and make a determination that the threshold condition group changes from a non-satisfied status to a satisfied status when the counted number attains the corresponding count threshold of the threshold condition group; and, judge whether the target object is moving laterally towards intersection with the longitudinal motion direction of the host vehicle, based upon evaluating the respective statuses of the plurality of threshold condition groups, with results of the judgement being supplied to the PCS for use in calculating the time to collision with the target object.

2. The intersection judgement apparatus as claimed in claim 1 wherein, only when all of the plurality of threshold condition groups become satisfied, the intersection judgement circuitry judges that the target object is moving laterally towards intersection with the longitudinal motion direction of the host vehicle.

3. The intersection judgement apparatus as claimed in claim 1 wherein, when at least one of the plurality of threshold condition groups becomes satisfied, the intersection judgement circuitry judges that the target object is moving laterally towards intersection with the advancement of the host vehicle.

4. The intersection judgement apparatus as claimed in claim 1 wherein the respective count threshold values assigned to the threshold condition groups vary in inverse proportion to the respective displacement threshold values assigned to the threshold condition groups.

5. The intersection judgement apparatus as claimed in claim 1, wherein for each of the threshold condition groups, the intersection judgement circuitry judges that the threshold condition group is satisfied when the counted number attains the corresponding count threshold within a predetermined count range (M), the count range comprising a predetermined number of consecutive timings at which respective lateral displacement amounts are calculated.

6. The intersection judgement apparatus as claimed in claim 5, wherein an identical count range is applied for each of the plurality of threshold condition groups.

7. The intersection judgement apparatus as claimed in claim 1, wherein the target object detection means comprises a radar apparatus configured to transmit radar waves within a first external region located ahead of the host vehicle and receive resultant reflected radar waves, and to produce radar information based on the received reflected waves, and a camera apparatus configured to capture successive images of contents of a second external region located ahead of the host vehicle and to produce image information based on the captured images, said second external region at least partially overlapping said first external region;

wherein the distance measurement circuitry measures the distance of the target object based on the radar information and the direction angle measurement circuitry measures the direction of the target object based on the image information, and wherein, a No. 1 lateral displacement amount is calculated based on a distance value derived from the radar information and a direction value derived from the image information, the intersection judgement circuitry evaluates the statuses of the threshold condition groups with respect to sequentially calculated values of the No. 1 lateral displacement amount.

8. The intersection judgement apparatus as claimed in claim 7, wherein the distance measurement circuitry is further configured to calculate the distance of the target object relative to the host vehicle based upon the image information, and the direction angle measurement circuitry is further configured to calculate the direction of the target object relative to the host vehicle based upon the radar information, and wherein the displacement amount calculation circuitry is configured to:
- calculate a first position error region by adding predetermined estimated image measurement error amounts to a first obtained position of the target object, the first obtained position being expressed by values of relative distance and relative direction of the target object respectively derived from the image information;
- calculate a second position error region by adding predetermined estimated radar measurement error amounts to a second obtained position for the target object, the second obtained position being expressed by values of relative distance and relative direction of the target object derived from the radar information; and
- calculate the No. 1 displacement amount, by employing the image information and the radar information, only under condition that at least some degree of overlap exists between the first position error region and the second position error region.

9. The intersection judgement apparatus as claimed in claim 7, wherein the distance measurement circuitry is further configured to calculate the distance of the target object from the host vehicle based upon the image information, and the direction angle measurement circuitry is further configured to calculate the direction angle of the target object relative to the host vehicle based upon the radar information;
and wherein the displacement amount calculation circuitry is configured to
calculate a position difference as a distance between a first obtained position of the target object and a second obtained position of the target object, the first obtained position being expressed by values of distance and direction calculated based on the image information, and the second obtained position being expressed by values of distance and direction calculated based on the radar information, and
calculate the No. 1 displacement amount, by employing the image information and the radar information, only under condition that the position difference amount is within a predetermined error range.

10. The intersection judgement apparatus as claimed in claim 7, wherein a No. 2 lateral displacement amount is calculated based on a value of the distance of the target object obtained based on the radar information and on a value of the direction of the target object obtained based on the radar information, the intersection judgement circuitry:
- evaluates a first plurality of threshold condition groups with respect to sequentially calculated values of the No. 1 lateral displacement amount and evaluates a second plurality of threshold condition groups with respect to sequentially calculated values of the No. 2 lateral displacement amount; and
- when it is judged that all of the first plurality of threshold condition groups are satisfied by values of the No. 1 lateral displacement amount while also all of the second plurality of threshold condition groups are satisfied by values of the No. 2 lateral displacement amount, judges that the target object is moving laterally towards intersection with the longitudinal motion direction of the host vehicle.

11. The intersection judgement apparatus as claimed in claim 1, wherein
a value of a displacement limit threshold is predetermined, higher than each of the values of the lower displacement thresholds respectively corresponding to the plurality of threshold condition groups, and
for each of the threshold condition groups, when a displacement amount exceeds the lower displacement threshold corresponding to the threshold condition group and also exceeds the displacement limit threshold, the intersection judgement circuitry omits to increment the count number accordingly.

12. The intersection judgement apparatus as claimed in claim 11, wherein the displacement limit threshold is predetermined in accordance with a type of target object required to be judged.

13. The intersection judgement apparatus as claimed in claim 1, wherein
a lower limit value of speed is predetermined in accordance with a type of target object which is required to be judged,
the intersection judgement circuitry calculates a motion speed of a target object as an average value, and
when an average value calculated by the intersection judgement circuitry does not attain the lower limit value of speed, the intersection judgement circuitry judges that the target object will not intersect with the advancement of the host vehicle, irrespective of respective statuses of the plurality of threshold condition groups.

14. The intersection judgement apparatus as claimed in claim 1, wherein the intersection judgement apparatus includes a computer incorporating a non-volatile storage apparatus having a computer program stored therein, wherein respective functions of the displacement amount calculation circuitry, the intersection judgement circuitry, the distance measurement circuitry and the direction angle measurement circuitry, are implemented by the computer in executing the stored program.

15. An intersection judgement apparatus incorporated in a PCS (pre-crash system) of a host vehicle for assisting the PCS to calculate a TTC (time to collision) with a target object, the intersection judgement apparatus comprising
- distance measurement circuitry configured for receiving target object detection information from target object detection means, and for periodically calculating updated values of a relative distance between the host vehicle and a target object based on the target object information, the target object information relating to an object positioned within an external region, located ahead of the host vehicle and to one side of a longitudinal motion direction of the host vehicle;
- direction angle measurement circuitry configured for periodically calculating updated values of a direction angle of the target object relative to the host vehicle, based on the target object information,
- displacement amount calculation circuitry configured for periodically calculating updated amounts of lateral displacement of the target object based upon currently calculated values of the relative distance and the relative direction angle of the target object, each lateral displacement amount being measured along a direction which is at right angles to the longitudinal motion direction of the host vehicle, and
- intersection judgement circuitry configured for applying the periodically calculated lateral displacement amounts in judgement processing for determining whether the target object is moving to laterally intersect with the longitudinal motion direction of the host vehicle;
wherein a displacement limit threshold is predetermined as corresponding to a specific class of target object, based on an estimated maximum value of motion speed of objects within the specific class, and wherein the intersection judgement circuitry is configured to:

execute the judgement processing based upon counting a number of calculation timings for which sequential ones of the calculated lateral displacement amounts are each within a displacement range extending between the displacement limit threshold and a predetermined lower displacement threshold, the displacement limit threshold being higher than the lower displacement threshold, and judge that the target object is moving to laterally intersect with the longitudinal motion direction of the host vehicle when a result of counting the number of calculation timings attains a predetermined count threshold, with results of the judgement being used by the PCS in calculating the TTC with the target object.

16. The intersection judgement apparatus as claimed in claim 15, wherein the intersection judgement circuitry judges that the target object is moving laterally towards intersection with the longitudinal motion direction of the host vehicle under condition that the result of counting the number of calculation timings attains the predetermined count threshold within a predetermined count range, the count range comprising a fixed number of consecutive calculation timings.

17. The intersection judgement apparatus as claimed in claim 15, wherein the intersection judgement apparatus includes a computer incorporating a non-volatile storage apparatus having a computer program stored therein, wherein respective functions of the displacement amount calculation circuitry, the intersection judgement circuitry, the distance measurement circuitry and the direction angle measurement circuitry, are implemented by the computer in executing the stored program.

18. The intersection judgement apparatus as claimed in claim 15, wherein the displacement limit threshold is established based on a maximum value of motion speed attainable by a person not in a motor vehicle.

19. The intersection judgement apparatus as claimed in claim 15, wherein the displacement limit threshold is established based on a maximum value of motion speed attainable by a pedestrian.

20. An intersection judgement apparatus incorporated in a PCS (pre-crash system) of a host vehicle for assisting the PCS to calculate a TTC (time to collision) with a target object, comprising a radar apparatus configured to transmit radar waves within a first external region located ahead of the host vehicle and receive resultant reflected radar waves, and to produce radar information based on the received reflected waves, and a camera apparatus configured to capture successive images of contents of a second external region located ahead of the host vehicle and to produce image information based on the captured images, the second external region at least partially overlapping the first external region;

wherein the intersection judgement apparatus comprises:

distance measurement circuitry configured for periodically calculating updated values of a relative distance of a target object from the host vehicle based on the radar information and updated values of the relative distance of the target object based on the image information, direction angle measurement circuitry configured for periodically calculating updated values of a relative direction angle of the target object with respect to the host vehicle based on the radar information and updated values of the relative direction angle of the target object based on the image information, displacement amount calculation circuitry configured for periodically calculating updated amounts of lateral displacement of the target object based upon the relative distance values and relative direction angle values of the target object, each lateral displacement amount being measured along an intersection direction oriented towards and at right angles to a longitudinal motion direction of the host vehicle, and intersection judgement circuitry configured for applying the periodically calculated lateral displacement amounts in judgement processing for judging whether the target object is moving substantially continuously along the intersection direction;

wherein the intersection judgement circuitry is configured to:

execute the judgement processing based on utilizing a plurality of threshold condition groups, each threshold condition group comprising a combination of a corresponding lower displacement threshold and a corresponding count threshold having respectively predetermined values, the corresponding lower displacement thresholds being respectively different and the corresponding count thresholds being respectively different, consecutively apply each of the threshold condition groups in a count operation of counting a number of times that each of sequential ones of the lateral displacement amounts exceeds the corresponding lower displacement threshold of the threshold condition group, and of judging that the threshold condition group changes from a non-satisfied status to a satisfied status when the counted number attains the corresponding count threshold of the threshold condition group, and judge whether the target object is moving laterally towards intersection with the longitudinal motion direction of the host vehicle, based upon evaluating respective statuses of the plurality of threshold condition groups, with results of the judgement being used by the PCS in calculating the TTC with the target object;

wherein designating a No. 1 lateral displacement amount as an amount of lateral displacement of the target object calculated based on a relative distance value derived from the radar information and on a relative direction angle value derived from the image information, the displacement amount calculation circuitry is configured to:

calculate a first position error region by adding predetermined estimated image measurement error amounts to a first obtained position of the target object, the first obtained position being expressed by the values of relative distance and relative direction angle calculated based on the image information;

calculate a second position error region by adding predetermined estimated radar measurement error amounts to a second obtained position for the target object, the second obtained position being expressed by the values of relative distance and relative direction angle calculated based on the radar information; and calculate the No. 1 displacement amount, by employing the image information and the radar information, only under condition that at least some degree of overlap exists between the first position error region and the second position error region.

21. The intersection judgement apparatus according to claim 20, wherein the displacement amount calculation circuitry is configured to:

apply the second obtained position for the target object in calculating a lateral displacement amount of the target object, and apply a resultant calculated lateral displacement amount in the count operation, when no degree of overlap exists between the first position error region and the second position error region, and apply the No. 1 lateral displacement amount as the lateral displacement amount in the count operation, when at least some degree of overlap exists between the first position error region and the second position error region.

22. The intersection judgement apparatus according to claim 20, wherein the displacement amount calculation circuitry is configured to:

apply the second obtained position for the target object in calculating a lateral displacement amount of the target object, and apply a resultant calculated lateral displacement amount in the count operation, when an amount of separation between the first obtained position and the second obtained position exceeds a predetermined error amount, and apply the No. 1 lateral displacement amount as the lateral displacement amount in the count operation, when at least some degree of overlap exists between the first position error region and the second position error region or an amount of separation between the first obtained position and the second obtained position does not exceed a predetermined error amount.

\* \* \* \* \*